(12) United States Patent  
Ichikawa et al.

(10) Patent No.: US 7,766,232 B2
(45) Date of Patent: Aug. 3, 2010

(54) RECORD MANAGEMENT SYSTEM AND METHOD TO TRACE CHEMICALS

(75) Inventors: Yoshiaki Ichikawa, Suwama (JP); Shiro Kobayashi, Isehara (JP)

(73) Assignee: Hitachi, Ltd., Tokyo (JP)

( * ) Notice: Subject to any disclaimer, the term of this patent is extended or adjusted under 35 U.S.C. 154(b) by 489 days.

(21) Appl. No.: 11/701,707

(22) Filed: Feb. 1, 2007

(65) Prior Publication Data

US 2007/0175976 A1 Aug. 2, 2007

(30) Foreign Application Priority Data

Feb. 1, 2006 (JP) .............................. 2006-024664

(51) Int. Cl.
*G06F 19/00* (2006.01)
(52) U.S. Cl. ..................................... 235/385
(58) Field of Classification Search ................. 235/385
See application file for complete search history.

(56) References Cited

U.S. PATENT DOCUMENTS

| | | | | |
|---|---|---|---|---|
| 7,185,811 | B2* | 3/2007 | Tomita ........................ | 235/385 |
| 7,455,225 | B1* | 11/2008 | Hadfield et al. ............. | 235/384 |
| 2003/0083918 | A1* | 5/2003 | Hoffman et al. ................ | 705/8 |
| 2006/0275794 | A1* | 12/2006 | Carrino et al. ................. | 435/6 |
| 2007/0050092 | A1* | 3/2007 | Kenyon et al. .............. | 700/266 |

FOREIGN PATENT DOCUMENTS

| | | |
|---|---|---|
| JP | 11-130213 A | 5/1999 |
| JP | 11-283123 A | 10/1999 |
| JP | 2005-112499 | 4/2005 |
| JP | 2005-149020 A | 6/2005 |
| JP | 2005-154045 | 6/2005 |

OTHER PUBLICATIONS

European Patent Office (EPO) international search report for EPO patent application EP07002204 (Jun. 18, 2007).

* cited by examiner

*Primary Examiner*—Michael G Lee
*Assistant Examiner*—David Tardif
(74) *Attorney, Agent, or Firm*—Townsend and Townsend and Crew LLP

(57) ABSTRACT

An operation for a chemical of indefinite form is managed so that operation record of the chemical is traceable. An IC tag (3) is attached to various containers (4a to 4c) each holding a chemical, and a chemical ID to identify the chemical held in each of the containers (4a to 4c) is stored in the IC tag (3). When an operation involving a mass change or a change of composition information is carried out, such as apportioning, mixing, reacting, and separating, while the containers (4a to 4c) serve as receivers of the chemical, a record management apparatus (1) newly generates a chemical ID, and a IC tag terminal (2) updates the chemical ID in the IC tag (3) to the new chemical ID. In addition, the record management apparatus (1) manages a correspondence between the chemical ID stored in the IC tag (3) (old chemical ID) and the chemical ID newly stored in the IC tag (3) (new chemical ID).

11 Claims, 16 Drawing Sheets

FIG. 4

IMPORTING OPERATION ACCEPTANCE SCREEN

231 {
- NAME — 2311
- ID NUMBER OF OWNER BUSINESS ENTITY — 2312
- MSDS — 2313
}

MASS — 232

233 {
- COMPOSITION 1 CAS NUMBER    MASS % — 2331
- COMPOSITION 2 CAS NUMBER    MASS % — 2331
- COMPOSITION 3 CAS NUMBER    MASS % — 2331
}

FIG. 5

APPORTIONING OPERATION ACCEPTANCE SCREEN

INPUT AMOUNT — 234

FIG. 6

MIXING OPERATION ACCEPTANCE SCREEN

235 {
- NAME ─ 2351
- ID NUMBER OF OWNER BUSINESS ENTITY ─ 2352
- MSDS ─ 2353

INPUT AMOUNT ─ 236

FIG. 7

REACTION OPERATION ACCEPTANCE SCREEN

237 {
- NAME ─ 2371
- ID NUMBER OF OWNER BUSINESS ENTITY ─ 2372
- MSDS ─ 2373

MASS ─ 238

239 {
- COMPOSITION 1 CAS NUMBER  MASS % ─ 2391
- COMPOSITION 2 CAS NUMBER  MASS % ─ 2391
- COMPOSITION 3 CAS NUMBER  MASS % ─ 2391

FIG. 8A

SEPARATING OPERATION ACCEPTANCE SCREEN (INPUT SIDE CONTAINER)

241 {
- NAME ─ 2411
- ID NUMBER OF OWNER BUSINESS ENTITY ─ 2412
- MSDS ─ 2413
}

MASS ─ 242

243 {
- COMPOSITION 1  CAS NUMBER   MASS % ─ 2431
- COMPOSITION 2  CAS NUMBER   MASS % ─ 2431
- COMPOSITION 3  CAS NUMBER   MASS % ─ 2431
}

FIG. 8B

SEPARATING OPERATION ACCEPTANCE SCREEN (RECEIVING SIDE CONTAINER)

INPUT AMOUNT ─ 244

FIG. 10

MANAGEMENT INFORMATION TL 141

| CHEMICAL ID | CHEMICAL NAME | OWNER BUSINESS ENTITY ID | MSDS |
|---|---|---|---|
| 10000001 | XY OIL | H23891-012 | **** |
| 10000002 | CC LIQUID | H23891-036 | **** |
| 10000003 | ZZ OIL | H23891-012 | **** |
| 10000004 | AB LIQUID | H23891-034 | **** |
| | | | |

FIG. 11

MASS UPDATE RECORD TL 142

| CHEMICAL ID | MASS (kg) | CONSISTENCY CHECK | UPDATED DATE AND TIME |
|---|---|---|---|
| 10000001 | 800 | OK | 05/11/01 10:00 |
| 10000002 | 500 | OK | 05/11/30 11:00 |
| 10000003 | 750 | OK | 05/12/01 11:30 |
| 10000001 | 550 | OK | 05/12/01 11:30 |
| 10000004 | 300 | OK | 05/12/10 12:30 |
| 10000005 | 500 | OK | 05/12/13 11:30 |
| 10000002 | 200 | OK | 05/12/13 11:30 |
| | | | |

FIG. 12

COMPOSITION INFORMATION TL 143

| CHEMICAL ID CONTAINING ELEMENT (1431) | CHEMICAL ID AS COMPONENT ELEMENT (1432) | CAS NUMBER (1433) | MASS % (1434) |
|---|---|---|---|
| 10000001 |  | 100-41-4 | 20 |
| 10000001 |  | 1330-20-7 | 80 |
| 10000002 |  | 71-43-2 | 100 |
| 10000003 | 10000001 |  | 50 |
| 10000003 | 10000002 |  | 50 |
| 10000004 |  | 71-43-2 | 100 |
| 10000005 | 10000004 |  | 100 |
| 10000006 |  | 108-90-7 | 5 |
| 10000006 |  | 95-50-1 | 15 |
| 10000006 |  | 7446-70-0 | 80 |
| 10000007 |  | 1330-20-7 | 100 |
| 10000008 |  | 100-41-4 | 100 |
| ⋮ | ⋮ | ⋮ | ⋮ |

FIG. 13

ID UPDATE RECORD TL 144

| NEW CHEMICAL ID | OPERATION TYPE | OLD CHEMICAL ID | UPDATED DATE AND TIME |
|---|---|---|---|
| 10000001 | IMPORTING | | 05/11/01 10:00 |
| 10000002 | IMPORTING | | 05/11/31 11:00 |
| 10000003 | MIXING | 10000002 | 05/12/01 11:30 |
| 10000004 | IMPORTING | | 0512/10 12:30 |
| 10000005 | APPORTIONING | 10000004 | 05/12/13 11:30 |
| 10000006 | REACTION | 10000005 | 05/12/13 15:00 |
| 10000007 | IMPORTING | | 05/12/15 10:00 |
| 10000008 | SEPARATING | 10000001 | 05/12/15 15:00 |
| ⋮ | ⋮ | ⋮ | ⋮ |

RECORD MANAGEMENT SYSTEM AND METHOD TO TRACE CHEMICALS

FIELD OF THE INVENTION

The present invention relates to a technique that manages an operation record for a chemical, in particular, a chemical of indefinite form such as liquid or gas.

BACKGROUND OF THE INVENTION

Japanese Patent Laid-open Publication No. 2005-154045 (hereinafter, referred to as "Patent Document 1") discloses a system that records temperature record information of a manufactured article, so that the expiration date of the article can be managed. This system is provided with a storing unit that stores for each article identification information characteristic of the article, a reading unit including a communication unit that extracts in a noncontact manner the identification information provided with the article, being attached to the article itself or a packaging member thereof, and transmits the information extracted to a network, a temperature measuring unit, installed on the reading unit or in the proximity thereof, that measures the temperature of the article and transmits the temperature information to the network, and an information storing unit that receives the identification information and the temperature information of the article via the network, and stores both information items.

Japanese Patent Laid-open Publication No. 2005-112499 (hereinafter, referred to as "Patent Document 2") discloses a system that consistently conducts, with regard to multiple articles, residual quantity/inventory management, order management/purchase support, and furthermore order acceptance management on the order acceptance side. This system manages both a residual quantity of articles which changes according to the use thereof, and inventory of the articles to constantly keep the articles in an available condition, and reflects the residual data of the articles obtained by the residual quantity management in the article inventory management, thereby ordering an article based on the article inventory management on which the residual quantity has been reflected.

SUMMARY OF THE INVENTION

Operations carried out in the lifecycle of a chemical of indefinite form, such as a liquid or gas, involve mass change and/or composition change, such as apportioning (dividing into small portions), mixing, reacting, and separating. The conventional arts as described above do not consider managing the record of such operations for liquid chemical.

The REACH (Registration Evaluation Authorization and Restriction of Chemicals) directive issued by the European Parliament in 2003 drastically revised conventional ways of considering chemical substance regulation in which a corporation positioned at the top of a supply chain of a distributed product is supposed to control effects (referred to as "hazards") from a pure substance (a single type of molecule or atom), produced by the corporation, on the human body or ecological system. The directive aims at performing management by tracing how a substance is used along the supply chain, and comprehending type, component ratio, usage, and sales volume of chemical substances included in a downstream product (e.g. TV set), so as to make overall judgment as to how large the risk of the chemical substance is for society at large.

The present invention has been made in view of these circumstances, and an object of the present invention is to manage an operation record for a chemical of indefinite form, in such a manner that the operation record is traceable.

In order to address the above subject, according to an aspect of the present invention, an IC tag is attached to a container that holds a chemical, and a chemical ID is stored in this IC tag so as to identify the chemical held in the container to which this IC tag is attached. When a container serves as a receiver of a chemical, and an operation involving mass change or composition change, such as apportioning, mixing, reacting, or separating, is performed, a chemical ID is newly generated and the chemical ID within the IC tag is replaced with the newly generated chemical ID. Furthermore, a correspondence between the chemical ID that was stored in the IC tag (former chemical ID) and the chemical ID newly stored in the IC tag (new chemical ID) is managed.

For example, the present invention includes a record management system that manages operation record for a chemical, comprising, an IC tag that is attached to each container for holding the chemical, an IC tag terminal that reads data from and writes data to the IC tag, and a record management apparatus that manages record information of the chemical, wherein, the IC tag terminal includes, a reading unit that reads from the IC tag, a chemical ID that identifies the chemical held in the container to which the IC tag is attached, a terminal side accepting unit that accepts from an operator an operational description for the chemical, a terminal side sending unit that sends, to the record management apparatus, the chemical ID read by the reading unit and operation information including the operational description for the chemical accepted by the terminal side accepting unit, a terminal side receiving unit that receives a chemical ID from the record management apparatus, and a writing unit that writes to the IC tag the chemical ID received by the terminal side receiving unit, and, the record management apparatus includes, a mass update record storing unit that stores mass update record of each chemical having the chemical ID, a composition storing unit that stores composition information including a chemical ID of a chemical constituting each chemical having the chemical ID, a chemical ID correspondence storing unit that stores a correspondence between a new chemical ID and an old chemical ID, a management apparatus side receiving unit that receives the operation information from the IC tag terminal, an updating unit that updates at least one of the mass update record storing unit, the composition storing unit, and the chemical ID correspondence storing unit, according to the operation information received by the management apparatus side receiving unit, and a management apparatus side sending unit that sends to the IC tag terminal, as the chemical ID, the new chemical ID newly stored in the chemical ID correspondence information storing unit, if the chemical ID correspondence storing unit is updated by the updating unit, wherein, when an operation type indicated by the operation information received by the management apparatus side receiving unit is either of "mixing" and "apportioning", according to an input amount included in the operation information, the updating unit updates mass update record stored in the mass update record storing unit as to the chemical having an input side chemical ID included in the operation information, simultaneously sets a receiving side chemical ID included in the operation information as the old chemical ID, and a chemical ID newly generated is set as the new chemical ID, stores in the chemical ID correspondence storing unit a correspondence between the new chemical ID and the old chemical ID, and stores, in the mass update record storing unit, the mass update record of the chemical having the new chemical ID, according to the mass update record stored in the mass update record storing unit as to the chemical having the old chemical ID included in the operation information and the input amount included in the operation information.

According to an aspect of the present invention, it is possible to manage the operation record for a chemical of indefinite form, in such a manner that the operation record is traceable.

BRIEF DESCRIPTION OF THE DRAWINGS

FIG. 4 illustrates an example of an entry form screen that accepts characteristic information of a chemical that is an object of an import operation;

FIG. 5 illustrates an example of an entry form screen that accepts characteristic information of a chemical that is the object of an apportioning operation;

FIG. 6 illustrates an example of an entry form screen that accepts characteristic information of a chemical that is the object of a mixing operation;

FIG. 7 illustrates an example of an entry form screen that accepts characteristic information of a chemical that is the object of a reacting operation;

FIG. 8A illustrates an example of an entry form screen that accepts characteristic information of a chemical after separation in an inputting side container, and FIG. 8B illustrates an example of an entry form screen that accepts characteristic information of a chemical inputted to a receiving side container;

FIG. 10 schematically illustrates registration contents of management information TL 141;

FIG. 11 schematically illustrates registration contents of mass update record TL 142;

FIG. 12 schematically illustrates registration contents of composition information TL 143;

FIG. 13 schematically illustrates registration contents of ID update record TL 144;

DETAILED DESCRIPTION OF THE PREFERRED EMBODIMENTS

One exemplary embodiment of the present invention will be explained in the following.

Figure 1:
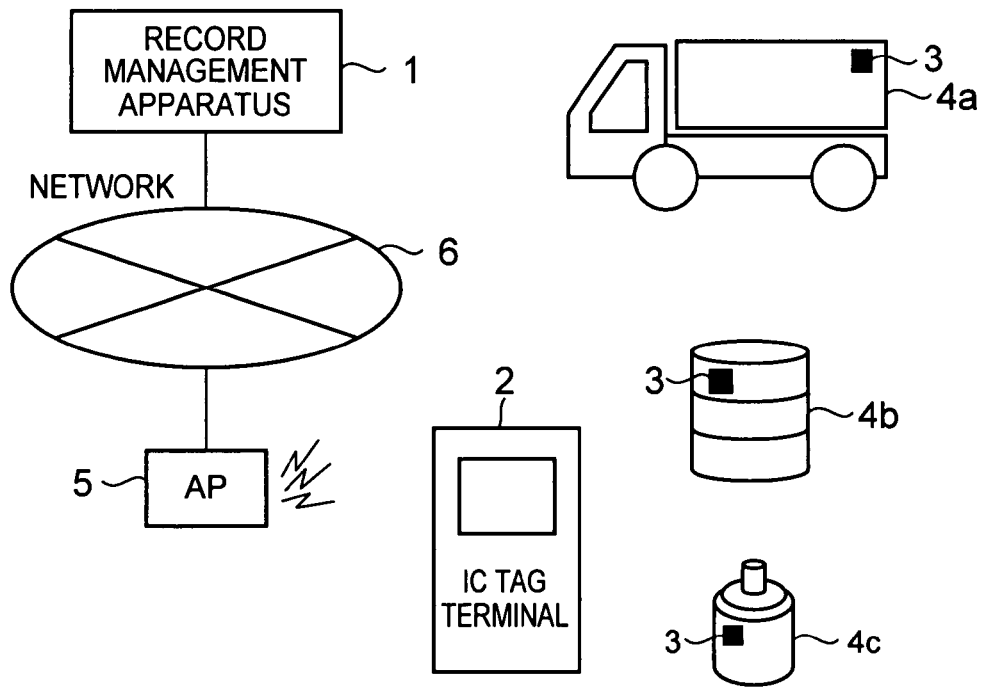
FIG. 1 is a schematic diagram showing a record management system to which one exemplary embodiment of the present invention is applied.

FIG. 1 is a schematic diagram showing a record management system to which one exemplary embodiment of the present invention is applied.

As illustrated, the record management system according to the present embodiment includes, a record management apparatus 1, an IC tag 3 that is attached to respective containers such as a tank truck 4a, a drum 4b, and a glass bottle 4c, each holding a chemical of indefinite form such as liquid or gas (simply referred to as "chemical" below), and an IC tag terminal 2 that reads data from and writes data into the IC tag 3.

The IC tag 3 stores a chemical ID that identifies a chemical held in the container to which this IC tag 3 is attached. Since an existing product can be utilized as the IC tag 3, a detailed explanation thereof will not be made here.

The IC tag terminal 2 is configured so that it can establish communication with the record management apparatus 1, via an AP (Access Point) 5 and a network 6. The IC tag terminal 2 reads a chemical ID from the IC tag 3, and transmits this chemical ID to the record management apparatus 1 together with information received from an operator. In addition, the IC tag terminal 2 writes to the IC tag 3 the chemical ID received from the record management apparatus 1.

Figure 2:
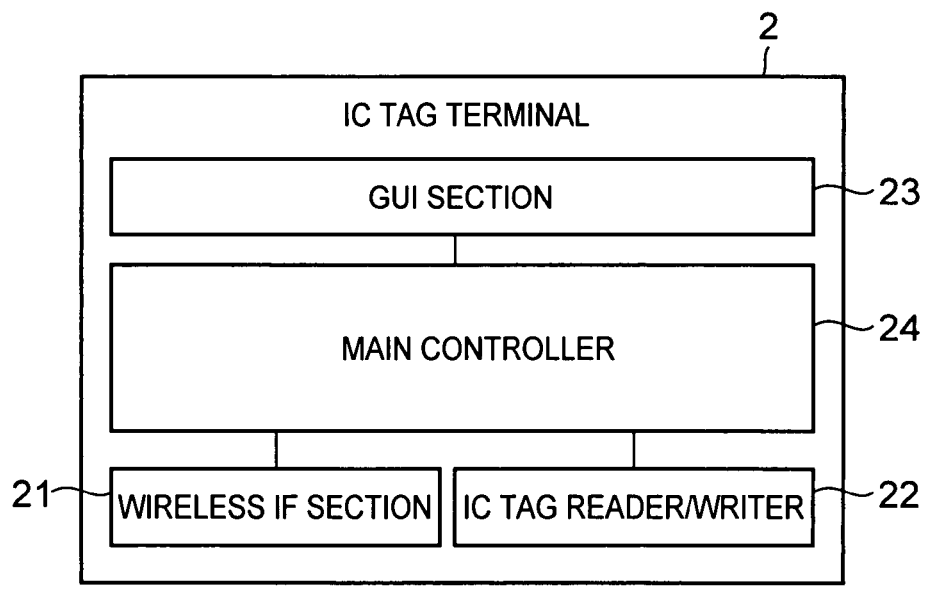
FIG. 2 is a schematic diagram of an IC tag terminal 2.

FIG. 2 is a schematic diagram showing the IC tag terminal 2.

As illustrated, the IC tag terminal 2 includes a wireless IF (interface) section 21 that performs communication with the record management apparatus 1 via an AP 5, an IC tag reader/writer 22 that reads data from and writes data to the IC tag 3, for example, in a noncontact manner, a GUI (Graphical User Interface) section 23 that incorporates a liquid crystal panel with a touch panel function, for example, and a main controller 24 that integrally controls each of those elements 21 to 23 above.

Figure 3:
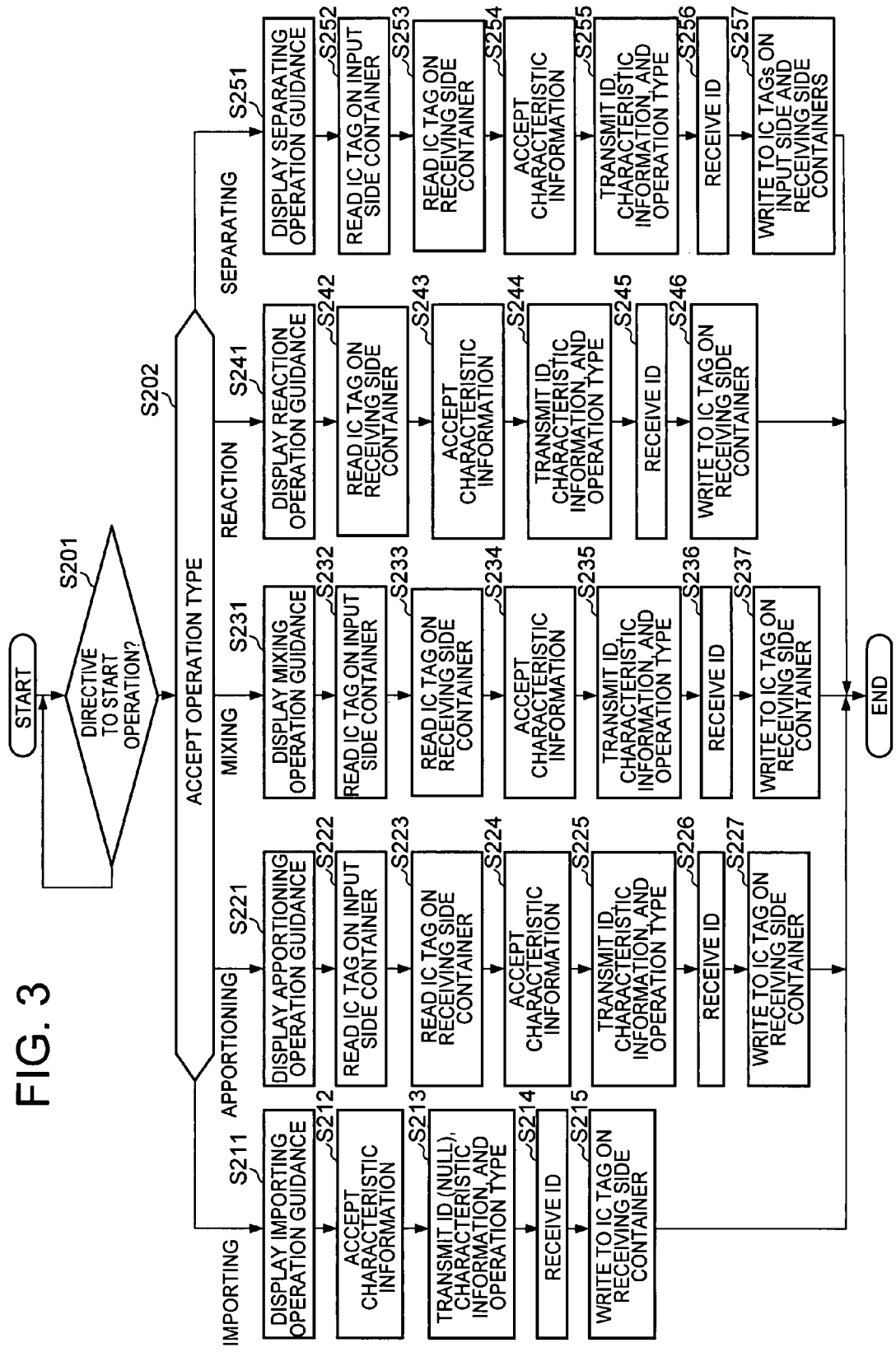
FIG. 3 is a flow diagram to explain an operation of the IC tag terminal 2 as shown in FIG. 2.

FIG. 3 is a flow diagram to explain an operation of the IC tag terminal 2 as shown in FIG. 2.

Upon accepting from a user a directive to start an operation (Yes in S201), the main controller 24 displays on the GUI section 23 a selection screen to accept an operation type to be conducted for the chemical and accepts from the user the operation type for the chemical (S202).

In the present embodiment, five operation types for the chemical are assumed, i.e., importing, apportioning (dividing into small portions), mixing, reacting, and separating. In the present embodiment, "importing" denotes an operation in which a chemical is transported by a tank truck not having the IC tag 3 attached thereon, from an area outside the region (an area outside the span of management using the IC tag 3), and inputted to a container such as the tank truck 4a with the IC tag 3, so that management using the IC tag 3 is started.

"Apportioning" denotes an operation in which a portion of the chemical held in a container, such as the tank truck 4a with the IC tag 3 (a container on the inputting side), is transferred to a container such as the drum 4b with another IC tag 3 (a container on the receiving side). It is to be noted here that this situation is based on the premise that the container on the receiving side is empty, or holding a chemical having the same composition as the chemical in the container on the inputting side.

"Mixing" denotes an operation in which a part of the chemical held in the container such as the glass bottle 4c with the IC tag 3 (the container being on the inputting side) is transferred to the container such as the drum 4b with another IC tag 3 (the container on the receiving side), and mixed with the chemical held in this receiving side container. Therefore, the situation above is based on the premise that the receiving side container holds a chemical having a composition different from the chemical in the inputting side container.

"Reacting" denotes an operation in which a chemical held in the container such as the drum 4b with the IC tag 3 (the container on the receiving side) is, subjected to a reaction by, for example, reaction heat, and changed to a chemical having a different composition.

"Separating" denotes an operation in which a chemical having at least one composition constituting the chemical held in the container, such as the drum 4b with the IC tag 3 (the container on the inputting side), is separated, and the separated chemical is transferred to the container such as the drum 4b with another IC tag 3 (the container on the receiving side). Therefore, the chemical held in the inputting side container is changed to a chemical having a different composition. It is to be noted here that the situation above is based on the premise that the container on the receiving side is empty, or holding a chemical having the same composition with the chemical obtained by the separation.

Moreover, when the operation type for the chemical accepted via the GUI section 23 is "importing", the main controller 24 starts import operation guidance, according to import guidance data that is registered in advance (S211), and firstly displays an entry form to accept characteristic information of the chemical that is an object of the importing operation. The main controller 24 receives from the user, via the GUI section 23, the characteristic information of the chemical that is the object of the importing operation (S212).

FIG. 4 illustrates an example of an entry form screen that accepts characteristic information of the chemical that is an object of the importing operation. As illustrated, the entry form includes an entry group 231 for entering management information of the chemical that is an object of the importing operation, an entry group 232 for entering an input amount into the receiving side container (mass information), and an entry group 233 for registering composition information of the chemical that is the object of the importing operation. The entry group 231 for entering the management information includes entry 2311 for entering the name of the chemical being imported, entry 2312 for entering an ID number of a business entity that is the owner of the chemical being imported (a unique code indicating a business entity having an ownership liability for the chemical), and entry 2313 for entering a document called an "MSDS (Material Safety Data Sheet)" or a destination for storing the document. The entry group 233 for entering composition information includes multiple pairs of entry 2331, each pair being made up of an entry for inputting a CAS number of the composition and an entry for registering mass percentage of the composition in the entire chemical.

Upon accepting from the user, via the entry form screen, the characteristic information (management information, mass information, and composition information) of the chemical that is the object of the importing operation, the main controller 24 generates operation information including this characteristic information, the chemical ID being a null code indicating that the receiving side container is empty, and the operation type "importing operation", and then transmits this generated information to the record management apparatus 1 via the wireless IF section 21 (S213). The main controller 24 waits for a chemical ID that is transmitted from the record management apparatus 1 via the wireless IF section 21 (S214).

Next, after receipt of the chemical ID from the record management apparatus 1, the main controller 24 outputs a message to the GUI section 23, prompting the user to bring the tag terminal 2 itself closer to the IC tag 3 on the receiving side container. When the IC tag reader/writer 22 becomes available for communication with the IC tag 3, the main controller 24 writes to this IC tag 3 the chemical ID received from the record management apparatus 1 (S215).

If the operation type for the chemical accepted via the GUI section 23 indicates "apportioning", the main controller 24 starts an apportioning operation guidance according to apportioning operation guidance data that is registered in advance (S221) Firstly, the main controller outputs a message to the GUI section 23, prompting the user to bring the IC tag terminal 2 itself closer to the IC tag 3 on the inputting side container. Then, when the IC tag reader/writer 22 becomes available for communication with the IC tag 3, the main controller 24 reads from this IC tag 3 the chemical ID (S222). Next, the main controller outputs a message to the GUI section 23, prompting the user to bring the IC tag terminal 2 itself closer to the IC tag 3 on the receiving side container. When the IC tag reader/writer 22 becomes available for communication with the IC tag 3, the main controller 24 reads from this IC tag 3 the chemical ID (S223). Subsequently, the main controller 24 displays an entry form to accept characteristic information of the chemical that is the object of the apportioning operation. The main controller 24 receives from the user, via the GUI section 23, the characteristic information of the chemical that is the object of the apportioning operation (S224). It is to be noted that the sequence from S222 to S224 is not limited to the flow as described above.

FIG. 5 illustrates an example of an entry form screen that accepts characteristic information of a chemical that is the object of the apportioning operation. As illustrated, the entry form includes an entry 234 for entering an input amount of the chemical from the inputting side container to the receiving side container.

Upon receipt of the characteristic information (input amount) of the chemical that is the object of the apportioning from a user via the entry form screen, the main controller 24 generates operation information including this characteristic information, the chemical ID read from the IC tag 3 on the inputting side container, the chemical ID read from the IC tag 3 on the receiving side container, and the operation type "apportioning", and transmits this generated operation information to the record management apparatus 1 via the wireless IF section 21 (S225). The main controller 24 then waits for a chemical ID that is transmitted from the record management apparatus 1 via the wireless IF section 21 (S226).

Next, upon receipt of the chemical ID from the record management apparatus 1, the main controller 24 outputs a message to the GUI section 23, prompting the user to bring the tag terminal 2 itself closer to the IC tag 3 on the receiving side container. When the IC tag reader/writer 22 becomes available for communication with the IC tag 3, the main controller 24 writes into this IC tag 3 the chemical ID received from the record management apparatus 1 (S227).

If the operation type for the chemical accepted via the GUI section 23 is "mixing", the main controller 24 starts the mixing operation guidance according to the mixing operation guidance data registered in advance (S231). Firstly, the main controller 24 outputs a message to the GUI section 23, prompting the user to bring the tag terminal 2 itself closer to the IC tag 3 on the inputting side container. Then, when the IC tag reader/writer 22 becomes available for communication with the IC tag 3, the main controller 24 reads a chemical ID (S232) from this IC tag 3. Next, the main controller 24 outputs a message to the GUI section 23, prompting the user to bring the tag terminal 2 itself closer to the IC tag 3 on the receiving side container. Then, when the IC tag reader/writer 22 becomes available for communication with the IC tag 3, the main controller 24 reads a chemical ID from this IC tag 3 (S233). Subsequently, the main controller 24 displays an entry form to accept characteristic information of the chemical that is the object of the mixing operation. Then, the main controller 24 accepts from the user via the GUI section 23, characteristic information of the chemical that is the object of the mixing operation (S234). It is to be noted that the sequence from S232 to S234 is not limited to the flow as described above.

FIG. 6 illustrates an example of an entry form screen that accepts characteristic information of a chemical that is the object of the mixing operation. As illustrated, the entry form screen includes an entry group 235 for entering management information of the chemical that is the object of the mixing operation, and an entry 236 for entering an input amount of the chemical from the inputting side container to the receiving side container. The entry group 235 for entering the management information includes an entry 2351 for entering the name of the chemical after the mixing, an entry 2352 for entering an ID number of a business entity that is the owner of the chemical after the mixing, and an entry 2353 for entering a document called as "MSDS" or a destination for storing the document.

Upon receipt of the characteristic information (the management information and the input amount) of the chemical that is the object of the mixing, from the user via the entry form screen, the main controller 24 generates operation information including this characteristic information, the chemical ID read from the IC tag on the inputting side container, the chemical ID read from the IC tag on the receiving side container, and the operation type "mixing operation", and transmits this generated information to the record management apparatus 1 via the wireless IF section 21 (S235). The main controller 24 then waits for a chemical ID that is transmitted from the record management apparatus 1 via the wireless IF section 21 (S236).

Next, upon receipt of the chemical ID from the record management apparatus 1, the main controller 24 outputs a message to the GUI section 23, prompting the user to bring the tag terminal 2 itself closer to the IC tag 3 on the receiving side container. Then, when the IC tag reader/writer 22 becomes available for communication with the IC tag 3, the main controller 24 writes to this IC tag 3 the chemical ID received from the record management apparatus 1 (S237).

If the operation type for the chemical accepted via the GUI section 23 is "reacting", the main controller 24 starts reacting operation guidance according to the reacting operation guidance data registered in advance (S241). Firstly, the main controller 24 outputs a message to the GUI section 23, prompting the user to bring the own tag terminal 2 itself closer to the IC tag 3 on the receiving side container. Then, when the IC tag reader/writer 22 becomes available for communication with the IC tag 3, the main controller 24 reads a chemical ID from this IC tag 3 (S242). Subsequently, the main controller 24 displays an entry form to accept characteristic information of the chemical that is the object of the reacting operation, and accepts from the user via the GUI section 23, characteristic information of the chemical that is the object of reacting operation (S243). It is to be noted that the sequence from S242 to S243 is not limited to the flow as described above.

FIG. 7 illustrates an example of an entry form screen that accepts characteristic information of a chemical that is the object of the reacting operation. As illustrated, the entry form screen includes an entry group 237 for entering management information of the chemical that is the object of the reacting operation, and an entry 238 for entering mass (mass information) of the chemical that is the object of the reacting operation in the receiving side container, and an entry 239 for entering composition information of the chemical that is the object of the reacting operation. The entry group 237 for entering the management information includes an entry 2371 for entering the name of the chemical after the reaction, an entry 2372 for entering ID number of a business entity being the owner of the chemical after the reaction, and an entry 2373 for entering a document called as "MSDS" or a destination for storing the document. The entry group 239 for entering the composition information includes multiple pairs of entry 2391, each pair is made up of an entry to input CAS number of the composition and an entry to register mass percentage of the composition in the entire chemical.

Upon receipt of the characteristic information (management information, mass information, and composition information) of the chemical that is the object of the reacting, from the user via the entry form screen, the main controller 24 generates operation information including this characteristic information, the chemical ID read from the IC tag on the receiving side container, and the operation type "reacting operation", and transmits this generated information to the record management apparatus 1 via the wireless IF section 21 (S244). Then main controller 24 waits for a chemical ID that is transmitted from the record management apparatus 1 via the wireless IF section 21 (S245).

Next, upon receipt of the chemical ID from the record management apparatus 1, the main controller 24 outputs a message to the GUI section 23, prompting the user to bring the tag terminal 2 itself closer to the IC tag 3 on the receiving side container. Then, when the IC tag reader/writer 22 becomes available for communication with the IC tag 3, the main controller 24 writes into this IC tag 3 the chemical ID received from the record management apparatus 1 (S246).

If the operation type for the chemical accepted via the GUI section 23 is "separating", the main controller 24 starts separating operation guidance according to the separating operation guidance data registered in advance (S251). Firstly, the main controller 24 outputs a message to the GUI section 23, prompting the user to bring the tag terminal 2 itself closer to the IC tag 3 on the receiving side container. Then, when the IC tag reader/writer 22 becomes available for communication with the IC tag 3, the main controller 24 reads a chemical ID from this IC tag 3 (S252). Next, the main controller 24 outputs a message to the GUI section 23, prompting the user to bring the tag terminal 2 itself closer to the IC tag 3 on the inputting side container. When the IC tag reader/writer 22 becomes available for communication with the IC tag 3, the main controller 24 reads a chemical ID from this IC tag 3 (S253). Subsequently, the main controller 24 displays an entry form to accept characteristic information of the chemical that is the object of the separating operation. Then, the main controller 24 accepts from the user via the GUI section 23, characteristic information of the chemical that is the object of the separating operation (S254). It is to be noted that the sequence from S252 to S254 is not limited to the flow as described above.

FIG. 8A illustrates an example of an entry form screen that accepts characteristic information of a chemical after the separation in the inputting side container. As illustrated, the entry form screen includes an entry group 241 for entering management information of the chemical after the separation in the inputting side container, and an entry 242 for entering mass (mass information) of the chemical after the separation in the inputting side container, and an entry group 243 for registering composition information of the chemical after the separation in the inputting side container. The entry group 241 for entering the management information includes an entry 2411 for entering the name of the chemical after the separation in the inputting side container, an entry 2412 for entering an ID number of a business entity that is the owner of the chemical after the separation in the inputting side container, and an entry 2413 for entering a document called an "MSDS" or a destination for storing the document. The entry group 243 for entering the composition information includes multiple pairs of entry 2431; each pair is made up of an entry for inputting the CAS number of the composition and an entry for registering mass percentage of the composition in the entire chemical.

FIG. 8B illustrates an example of an entry form screen that accepts characteristic information of a chemical inputted in a receiving side container. As illustrated, the entry form screen includes an entry 244 for entering the input amount (mass information) of the chemical being separated from the inputting side container to the receiving side container.

Upon receipt of the characteristic information (management information, mass information, and composition information) of the chemical after the separation in the inputting side container, from the user via the entry form screen, the main controller 24 generates operation information including this characteristic information, the chemical ID read from the IC tag on the inputting side container, the chemical ID read from the IC tag on the receiving side container, and the operation type "separating operation", and transmits this generated information to the record management apparatus 1 via the wireless IF section 21 (S255). The main controller 24 waits for a chemical ID that is transmitted from the record management apparatus 1 via the wireless IF section 21 (S256).

Next, upon receipt of the chemical ID in each of the inputting side container and the receiving side container, from the record management apparatus 1, the main controller 24 outputs a message to the GUI section 23, prompting the user to bring the tag terminal 2 itself closer to the IC tag 3 on the inputting side container. When the IC tag reader/writer 22 becomes available for communication with the IC tag 3, the main controller 24 writes to this IC tag 3 the chemical ID of the inputting side container received from the record management apparatus 1. Similarly, the main controller 24 outputs a message, prompting the user to bring the tag terminal 2 itself closer to the IC tag 3 on the receiving side container. When the IC tag reader/writer 22 becomes available for communication with the IC tag 3, the main controller 24 writes to this IC tag 3 the chemical ID of the receiving side container received from the record management apparatus 1 (S257).

The explanation is continued, returning to FIG. 1.

The record management apparatus 1 manages operation histories for the chemicals held respectively in the containers 4a to 4c, by using the chemical ID stored in the IC tag 3 provided on each of the containers 4a to 4c.

Figure 9:
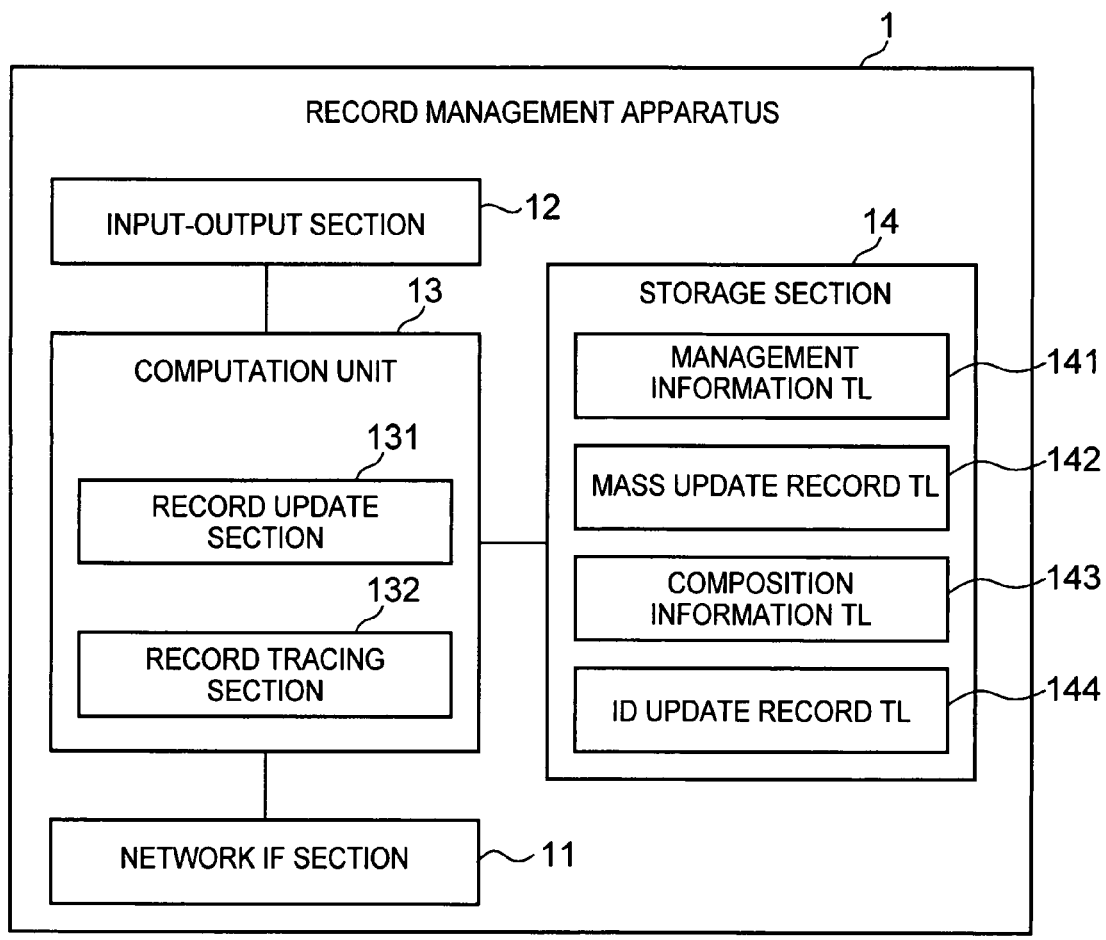
FIG. 9 is a schematic diagram showing a record management apparatus 1.

FIG. 9 is a schematic diagram showing the record management apparatus 1.

As illustrated, the record management apparatus 1 is provided with a network IF (Interface) section 11 to establish connection with the network 6, an input-output section 12 that inputs and outputs information, such as an input device and a display device, an computation unit 13, and a storage section 14.

The storage section 14 includes management information TL (table) 141, mass update record TL 142, composition information TL 143, and ID update record TL 144.

The management information TL 141 stores management information of chemicals that are held in the containers 4a to 4c, respectively. FIG. 10 schematically illustrates registration contents of the management information TL 141. As illustrated, a record 1410 of the management information is registered, as to each chemical held in the containers 4a to 4c. The record 1410 includes a field 1411 to register the chemical ID, a field 1412 to register the name of the chemical, a field 1413 to register the ID number of the business entity that is the owner of the chemical, and a field 1414 to register the MSDS document or a location for storing the document.

The mass update record TL 142 stores mass update information as to each of the chemicals given the chemical ID. FIG. 11 schematically illustrates registration contents of the mass update record TL 142. As illustrated, the mass update record TL 142 registers a record 1420 of update information, every time the mass of the chemical is updated. The record 1420 includes a 1421 to register the chemical ID, a field 1422 to register the mass of the chemical, a field 1423 to register a consistency check result, and a field 1424 to register the mass updated date and time. Here, "consistency" means the consistency of mass conservation before and after updating of mass. For example, regarding the chemical in the inputting side container, if a value (residual amount) obtained by subtracting the input amount from the mass before the mass updating becomes a negative value, "NG" is registered as a result of the consistency check.

The composition information TL 143 stores composition information of various chemicals each given a chemical ID. FIG. 12 schematically illustrates registration contents of the composition information TL 143. As illustrated, a record 1430 of the composition information is registered in the composition information TL 143 on a composition element basis of a chemical. The record 1430 includes a field 1431 to register the chemical ID of a chemical containing a target composition element, a field 1432 to register the chemical ID of the target composition element, a field 1433 to register CAS number of the target composition element, and a field 1434 to register the mass percentage of the target composition element in the chemical containing the composition element. Here, if the composition element is given a chemical ID, this chemical ID is registered in the field 1432, and the field 1433 is set to null. If no chemical ID is given to the composition element, the field 1432 is set to null, and the CAS number of the composition is registered in the field 1433.

In the ID update record TL 144, there is registered a record 1440 of ID update information every time a chemical ID is newly issued. FIG. 13 schematically illustrates registration contents of the ID update record TL 144. As illustrated, a record 1440 of the ID update information is registered for each chemical ID in the update record TL 144. The record 1440 includes a field 1441 to register a chemical ID (new chemical ID) newly issued, a field 1442 to register an operation type that is a cause of the new chemical ID being issued, a field 1443 to register the chemical ID (old chemical ID) that was registered in the IC tag 3 in which the new chemical ID is registered, and a field 1444 to register the date and time when the old chemical ID is replaced with the new chemical ID.

The computation unit 13 includes a record update section 131 and a record tracing section 132. The record update section 131 updates the TL 141 to TL 144 every time an operation is carried out for each of the chemicals held in the containers 4a to 4c (record updating process). The record tracing section 132 traces and checks the operation record for the chemical having a chemical ID specified, and outputs a result of tracing (record tracing process).

Figure 14:
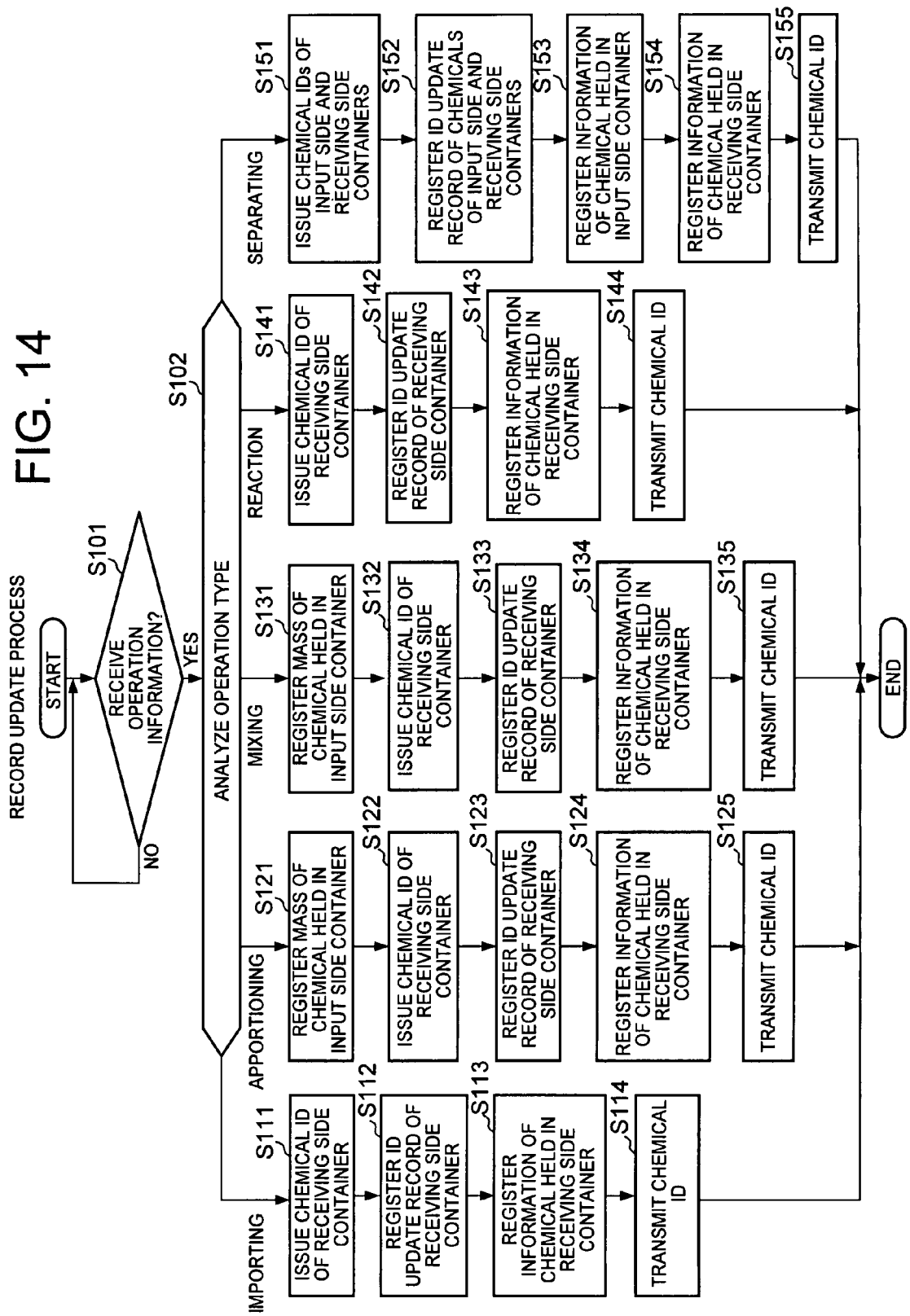
FIG. 14 is an illustration to explain a record update process of the record management apparatus 1.

FIG. 14 is an illustration to explain the record updating process of the record management apparatus 1.

When the record update section 131 receives operation information from the IC tag terminal 2 via the network IF section 11 (S101), the operation type included in the operation information is analyzed (S102).

In S102, if the operation type is "importing", the record update section 131 generates a unique code (e.g., serial number) as a new chemical ID of the chemical held in the receiving side container (S111). In addition, a new record 1440 is registered in the ID update record TL 144, and the new chemical ID, the operation type "importing", a null code indicating that the old chemical ID is not set in the field 1443, and the current date and time, are respectively registered in the fields 1441, 1442, 1443, and 1444 of this record 1440 (S112).

Further, the record update section 131 registers a new record 1410 in the management information TL 141, and the new chemical ID is registered in the field 1411, and the name of the chemical, owner business entity ID, and MSDS or its storing destination included in the operation information received are respectively stored in the fields 1412 to 1414.

The record update section 131 registers a new record 1420 in the mass update record TL 142, and the new chemical ID, mass information included in the operation information received, the result of the consistency check, and the current date and time are respectively registered in the fields 1421, 1422, 1423, and 1424 of this record 1420. It is to be noted that if the operation type is "importing", the record 1420 currently registered in the mass update record TL 142 is an initial record 1420 having the new chemical ID. Therefore, "OK" is registered as the result of consistency check.

The record update section 131 registers a record 1430 in the composition information TL 143 for each item of composition information included in the operation information received, and the new chemical ID is registered in the field 1431, a null code, indicating that the chemical ID is not allocated to the composition element, is registered in the field 1432, and the CAS number and mass percentage of the corresponding composition information are registered respectively in the fields 1433 to 1434 (S113).

The record update section 131 transmits to the IC tag terminal 2 the new chemical ID of the chemical held in the receiving side container, via the network IF section 11 (S114).

In S102, if the operation type is "apportioning", the record update section 131 searches the mass update record TL 142 for a record 1420 that has the chemical ID corresponding to the chemical held in the input side container included in the operation information received, the record 1420 also having the most recent updated date and time registered in the field 1424. The consistency check is performed by calculating a value obtained by subtracting the mass (input amount) included in the operation information received, from the mass registered in the field 1422 of the record 1420 retrieved, and determining whether or not this calculated value indicates a proper value (e.g., positive value). Next, the record update section 131 registers a new record 1420 in the mass update record TL 142, and the chemical ID of the chemical held in the input side container, and the calculated value, a result of the consistency check, and the current date and time are respectively registered in the fields 1421, 1422, 1423, and 1424 of the record 1420 (S121).

The record update section 131 generates a unique code (e.g., serial number) as a new chemical ID of the chemical held in the receiving side container (S122). In addition, a new record 1440 is registered in the ID update record TL 144, the new chemical ID and the operation type "apportioning" are respectively registered in the fields 1441 and 1442, a chemical ID of the chemical held in the receiving side container included in the operation information received is registered in the field 1443 as the old chemical ID, and the current date and time are registered in the field 1444 (S123).

Furthermore, the record update section 131 searches the management information TL 141 for a record 1410 that has in the field 1411 the chemical ID of the chemical held in the receiving side container included in the operation information received. Next, the record update section 131 registers a new record 1410 in the management information TL 141, a new chemical ID is registered in the field 1411 of this record 1410, and the name of the chemical, owner business entity ID, and MSDS or its storing destination, which are registered in the fields 1412 to 1414 of the record 1410 retrieved, are respectively registered in the fields 1412 to 1414 of the new record.

The record update section 131 searches the mass update record TL 142 for a record 1420 that has the chemical ID corresponding to the chemical held in the receiving side container included in the received operation information, the record 1420 also having the most recent updated date and time registered in the field 1424. The consistency check is performed by calculating a value obtained by adding the mass (input amount) included in the operation information received, to the mass registered in the field 1422 of the record 1420 being retrieved, and determining whether or not this calculated value indicates a proper value (e.g., less than a predetermined value). Next, the record update section 131 registers a new record 1420 in the mass update record TL 142, and the new chemical ID, the calculated value, a result of the consistency check, and the current date and time are respectively registered in the fields 1421, 1422, 1423, and 1424 of the record 1420.

The record update section 131 registers a new record 1430 in the composition information TL 143, and the new chemical ID, the chemical ID of the chemical held in the receiving side container included in the operation information being received, a null code, and the mass percentage "100", are respectively registered in the fields 1431, 1432, 1433, and 1434 (S124).

The record update section 131 transmits to the IC tag terminal 2 the new chemical ID of the chemical held in the receiving side container, via the network IF section 11 (S125).

In S102, if the operation type is "mixing", the record update section 131 searches the mass update record TL 142 for a record 1420 that has the chemical ID corresponding to the chemical held in the input side container included in the received operation information, the record 1420 also having the most recent updated date and time registered in the field 1424. The consistency check is performed by calculating a value obtained by subtracting the mass (input amount) included in the operation information received, from the mass registered in the field 1422 of the record 1420 retrieved, and determining whether or not this calculated value indicates a proper value (e.g., positive value). Next, the record update section 131 registers a new record 1420 in the mass update record TL 142, and the chemical ID of the chemical held in the input side container, the calculated value, the result of the consistency check, and the current date and time are respectively registered in the fields 1421, 1422, 1423, and 1424 of the record 1420 (S131).

The record update section 131 generates a unique code (e.g., serial number) as a new chemical ID of the chemical held in the receiving side container (S132). In addition, a new record 1440 is registered in the ID update record TL 144, the new chemical ID and the operation type "mixing" are respectively registered in the fields 1441 and 1442, the chemical ID of the chemical held in the receiving side container included in the operation information received is registered as the old chemical ID in the field 1443, and the current date and time is registered in the field 1444 (S133).

Further, the record update section 131 registers a new record 1410 in the management information TL 141, the new chemical ID is registered in the field 1411, and the name of the chemical, owner business entity ID, and MSDS or its storing destination included in the operation information being received are respectively stored in the fields 1412 to 1414.

The record update section 131 searches the mass update record TL 142 for a record 1420 that has the chemical ID corresponding to the chemical held in the receiving side container included in the received operation information, the record 1420 also having the most recent updated date and time registered in the field 1424. The consistency check is performed by calculating a value obtained by adding the mass (input amount) included in the operation information received, to the mass registered in the field 1422 of the record 1420 being retrieved, and determining whether or not this calculated value indicates a proper value (e.g., less than a predetermined value). Next, the record update section 131 registers a new record 1420 in the mass update record TL 142, and a new chemical ID, the calculated value, a result of the consistency check, and the current date and time are respectively registered in the fields 1421, 1422, 1423, and 1424 of the record 1420.

The record update section 131 calculates a ratio between the mass (input amount) included in the operation information received and the calculated value registered in the field 1422 of the record 1420 newly registered in the mass update record TL 142, and the ratio is set as the mass percentage of the inputted chemical. In addition, a value is calculated by subtracting the mass percentage of the inputted chemical from one hundred, and this obtained value is set as the mass percentage of the received chemical. Next, the record update section 131 registers two new records 1430 in the composition information TL 143. The new chemical ID, the chemical ID of the chemical held in the receiving side container included in the operation information received, a null code, and the mass percentage of the received chemical calculated are respectively registered in the fields 1431, 1432, 1433, and 1434 of one of the records 1430. The new chemical ID, the chemical ID of the chemical held in the input side container included in the operation information received, a null code, and the mass percentage of the inputted chemical calculated are respectively registered in the fields 1431, 1432, 1433, and 1434 of the other of the records 1430 (S134).

The record update section 131 transmits to the IC tag terminal 2 the new chemical ID of the chemical held in the receiving side container, via the network IF section 11 (S135).

In S102, if the operation type is "reacting", the record update section 131 generates a unique code (e.g., serial number) as a new chemical ID of the chemical held in the receiving side container (S141). In addition, a new record 1440 is registered in the ID update record TL 144, the new chemical ID and the operation type "reacting" are respectively registered in the fields 1441 and 1442, and the chemical ID of the chemical held in the receiving side container included in the operation information being received is registered as the old chemical ID in the field 1443, and the current date and time are registered in the field 1444 (S142).

Further, the record update section 131 registers a new record 1410 in the management information TL 141, the new chemical ID is registered in the field 1411, and the name of the chemical, owner business entity ID, and MSDS or its storing destination included in the operation information received are respectively registered in the fields 1412 to 1414.

The record update section 131 registers a new record 1420 in the mass update record TL 142, and the new chemical ID, mass information included in the operation information received, the result of the consistency check, and the current date and time are respectively registered in the fields 1421, 1422, 1423, and 1424 of this record 1420. It is to be noted that if the operation type is "reacting", the record 1420 currently registered in the mass update record TL 142 is an initial record 1420 having the new chemical ID. Therefore, "OK" is registered as the result of the consistency check.

The record update section 131 registers a record 1430 in the composition information TL 143 for each item of composition information included in the operation information received, the new chemical ID is registered in the field 1431, a null code indicating that the chemical ID is not allocated to the composition element is registered in the field 1432, and the CAS number and mass percentage of the corresponding composition information are respectively registered in the fields 1433 to 1434 (S143).

The record update section 131 then transmits to the IC tag terminal 2 the new chemical ID of the chemical held in the receiving side container, via the network IF section 11 (S144).

In S102, if the operation type is "separating", the record update section 131 generates unique codes (e.g., serial numbers) as new chemical IDs of the chemical held in the input side container and the chemical held in the receiving side container (S151). In addition, two new records 1440 are registered in the ID update record TL 144. The new chemical ID of the chemical held in the input side container and the operation type "separating" are respectively registered in the fields 1441 and 1442, the chemical ID of the chemical held in the input side container included in the operation information received is registered in the field 1443 as the old chemical ID, and the current date and time are registered in the field 1444 of one of the records 1440. Similarly, the new chemical ID of the chemical held in the receiving side container and the operation type "separating" are respectively registered in the fields 1441 and 1442, the chemical ID of the chemical held in the receiving side container included in the operation information received is registered as the old chemical ID in the field 1443, and the current date and time are registered in the field 1444 of the other of the records 1440. (S152).

Further, the record update section 131 registers a new record 1410 in the management information TL 141, the new chemical ID of the chemical held in the input side container is registered in the field 1411, and the name of the chemical, owner business entity ID, and MSDS or its storing destination included in the operation information received are respectively registered in the fields 1412 to 1414.

The record update section 131 registers a new record 1420 in the mass update record TL 142, and the new chemical ID of the chemical held in the input side container, mass information (mass of the chemical after reaction held in the input side container) included in the operation information received, the result of the consistency check, and the current date and time are respectively registered in the fields 1421, 1422, 1423, and 1424 of this record 1420. It is to be noted that if the operation type is "reacting", the record 1420 currently registered in the mass update record TL 142 is an initial record 1420 having the new chemical ID. Therefore, "OK" is registered as the result of the consistency check.

The record update section 131 registers a record 1430 in the composition information TL 143 for each composition information included in the operation information received, and the new chemical ID of the chemical held in the input side container is registered in the field 1431, a null code indicating that the chemical ID is not allocated to the composition element is registered in the field 1432, and the CAS number and mass percentage of the corresponding composition information are respectively registered in the fields 1433 to 1434 (S153).

Furthermore, the record update section 131 searches the management information TL 141 for a record 1410 that has in the field 1411 the chemical ID of the chemical held in the receiving side container included in the operation information received. Next, the record update section 131 registers a new record 1410 in the management information TL 141, a new chemical ID is registered in the field 1411 of this record 1410, and the name of the chemical, owner business entity ID, and MSDS or its storing destination, which are registered in the fields 1412 to 1414 of the record 1410 retrieved, are respectively registered in the fields 1412 to 1414 of the new record.

The record update section 131 searches the mass update record TL 142 for a record 1420 that has the chemical ID corresponding to the chemical held in the receiving side container included in the received operation information, the record 1402 also having the most recent updated date and time registered in the field 1424. The consistency check is performed by calculating a value obtained by adding the mass (input amount), included in the operation information received, to the mass registered in the field 1422 of the record 1420 being retrieved, and determining whether or not this calculated value indicates a proper value (e.g., less than a predetermined value). Next, the record update section 131 registers a new record 1420 in the mass update record TL 142, the new chemical ID of the chemical held in the receiving side container, the calculated value, a result of the consistency check, and the current date and time are respectively registered in the fields 1421, 1422, 1423, and 1424 of the record 1420.

The record update section 131 registers a new record 1430 in the composition information TL 143, and the new chemical ID, the chemical ID of the chemical held in the receiving side container included in the operation information received, a null code, and mass percentage "100", are respectively registered in the fields 1431, 1432, 1433, and 1434 (S154).

The record update section 131 transmits to the IC tag terminal 2 the new chemical ID of the chemical held in the input side container and the new chemical ID of the chemical held in the receiving side container, via the network IF section 11 (S155).

Figure 15:
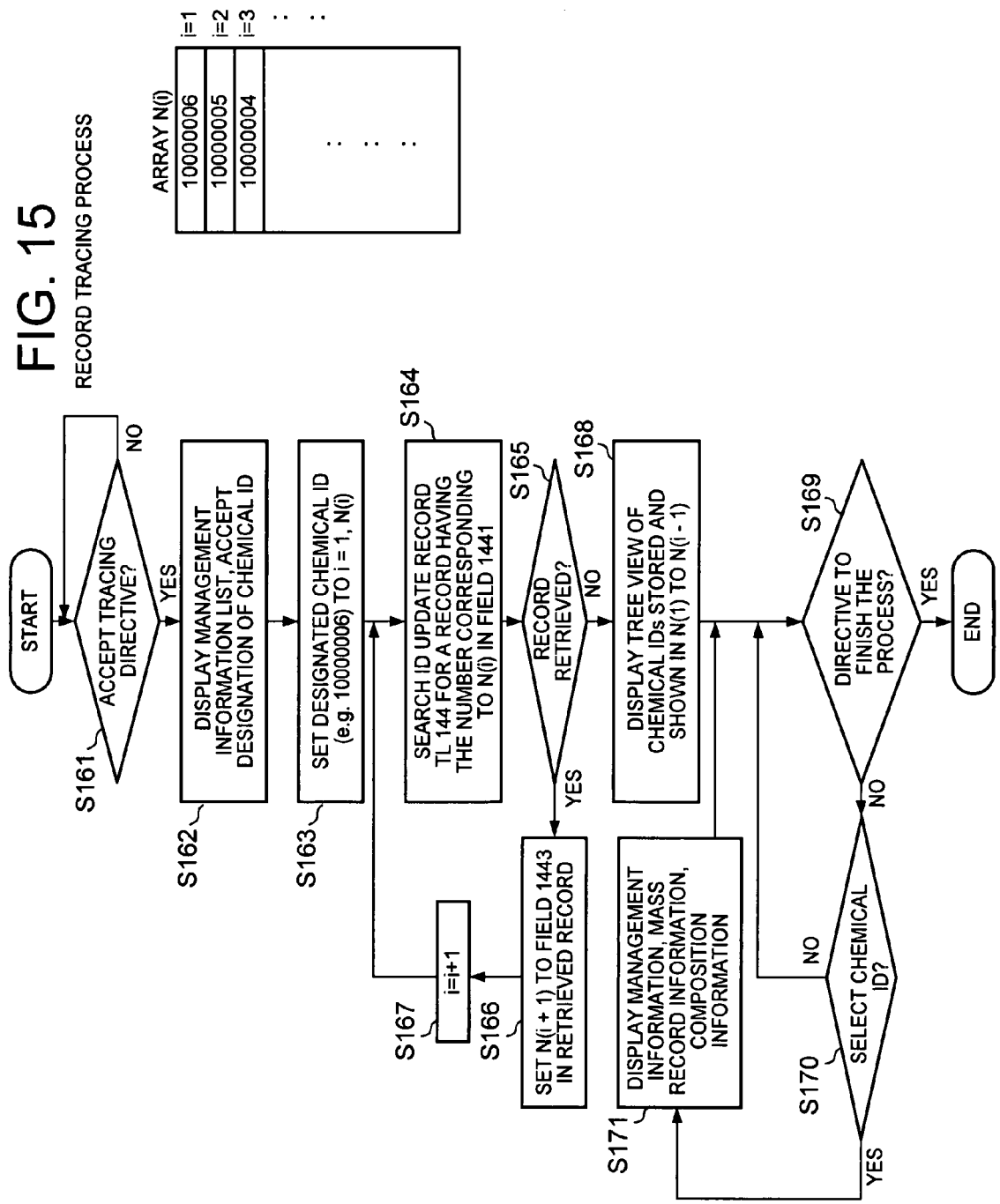
FIG. 15 is an illustration to explain a record tracing process of the record management apparatus 1.

FIG. 15 is an illustration to explain a record tracing process of the record management apparatus 1.

When a record tracing instruction is received from a user via the input-output section 12 (YES in S161), the record tracing section 132 displays a list of records 1410 registered in the management information TL 141, and accepts from the user a designation of a chemical ID of the chemical for which the record tracing is to be conducted (S162).

Figure 16:
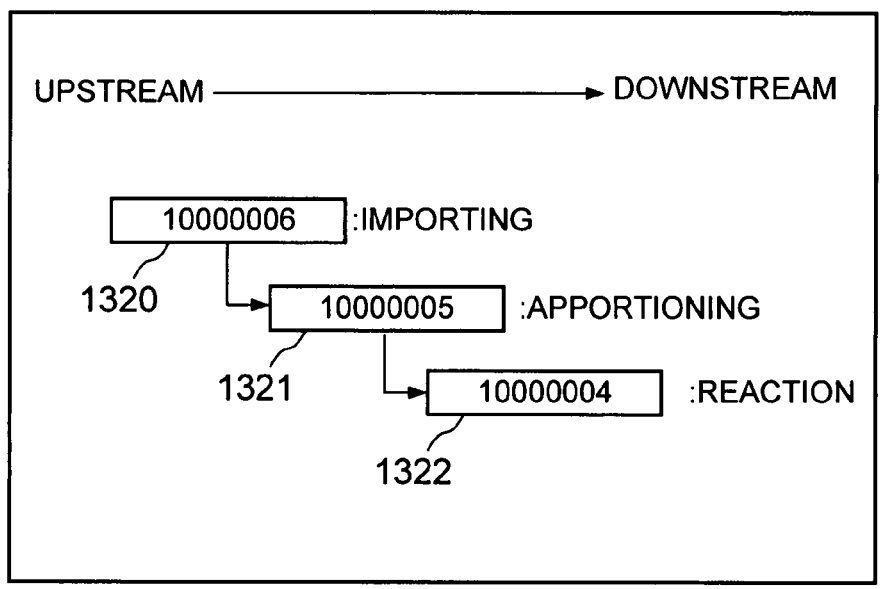
FIG. 16 schematically illustrates a tree view example of a tracing survey result.

Next, the record tracing section 132 sets a count value i to "1" and sets the designated chemical ID to array N (i). These settings are then stored in a memory or the like (S163). Subsequently, the record tracing section 132 searches the ID update record TL 144 for a record 1440 having the array N(i) registered as a new chemical ID in the field 1441 (S164). If such a record 1440 is successfully retrieved (YES in S165), the array N(i+1) is set as the old chemical ID that is registered in the field 1443 of the record 1440, and it is stored in the memory or the like (S166). The count value i is incremented by one (i=i+1) (S167), and the process returns to S164. On the other hand, if a record 1440 cannot be retrieved in S164 (NO in S165), chemical IDs respectively set in the array N(1) to array N(i−1) stored in the memory or the like are displayed in the input-output section 12 according to the array sequence, in a tree view, together with the operation type registered in the field 1442 of the record 1440 in which each of those chemical IDs are registered in the field 1441 as the new chemical IDs (S168). FIG. 16 schematically illustrates a tree view example of the tracing survey result. In this particular example, multiple chemical IDs 1320 to 1322 are displayed in a tree view from upstream to downstream, together with the operation types that cause the issuance of the chemical ID. This tree view allows the user to comprehend how the chemical ID has changed.

Figure 17:
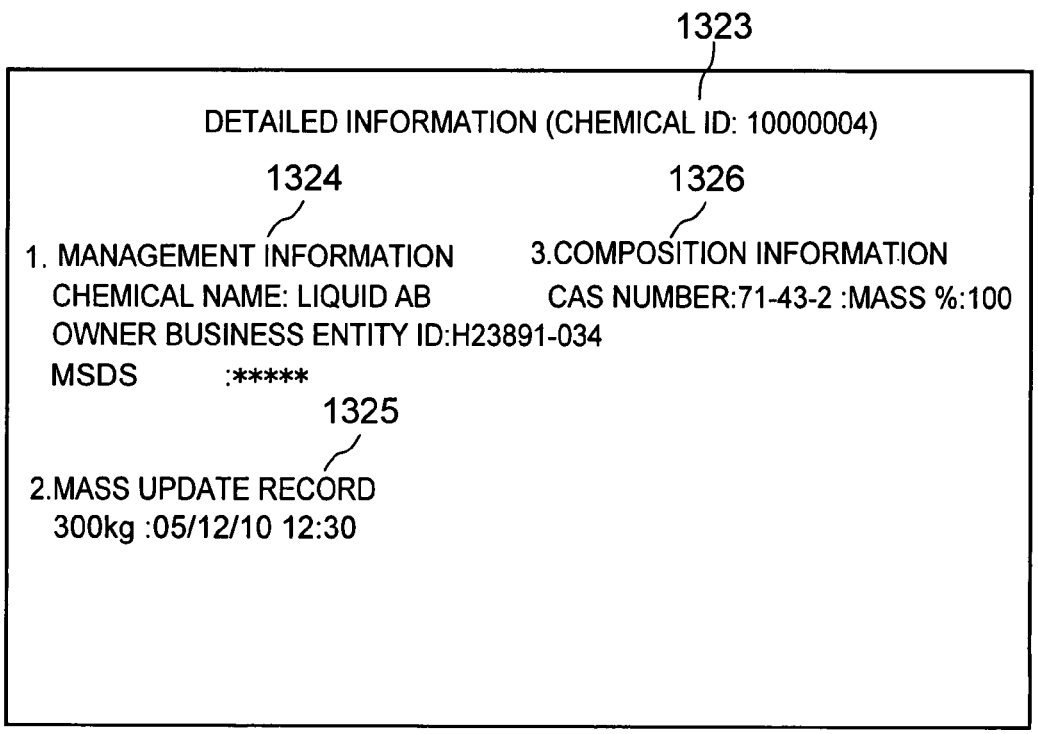
FIG. 17 schematically illustrates a detailed display example of the tracing survey result.

When the record tracing section 132 accepts a termination direction from the user via the input-output section 12 (YES in S169), this flow is ended. When the record tracing section 132 accepts from the user, via the input-output section 12, a selection of a desired chemical ID from chemical IDs displayed in the tree view (YES in S170), the record tracing section 132 searches the management information TL 141 for a record 1410 having the management information in which the selected chemical ID is registered in the field 1411, searches the mass update record TL 142 for a record 1420 having the mass update information in which the selected chemical ID is registered in the field 1421, and further searches the composition information TL 143 for a record 1430 having the composition information in which the retrieved chemical ID is registered in the field 1431. The record tracing section 132 generates detailed screen data including these retrieved records, and displays the generated data on the input-output section 12 (S171). FIG. 17 schematically illustrates a detailed display example of the tracing survey result. This particular example includes displayed management information 1324, mass update record 1325, and composition information 1326 of the chemical having the chemical ID 1323 that is selected by the user. This tree view allows the user to comprehend the details of the chemical.

Figure 18:
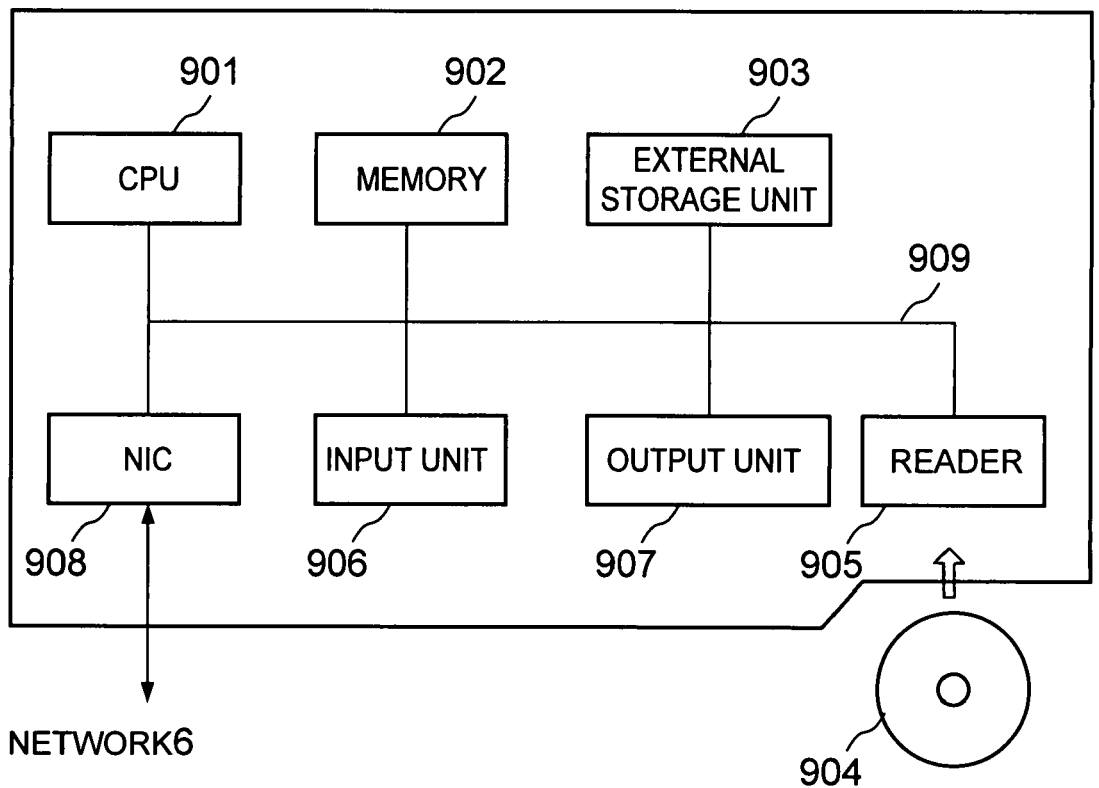
FIG. 18 illustrates a hardware configuration of the record management apparatus 1.

The record management apparatus 1 having the above configuration can be implemented in a computer system such as a personal computer, which incorporates, as shown in FIG. 18, a CPU 901, a memory 902, an external storage unit 903 such as a HDD, a reader 905 that reads data from a recording medium 904 such as a CD-ROM, DVD-ROM or IC card, an input unit 906 such as a keyboard or a mouse, an output unit 907 such as a monitor or a printer, an NIC 908 to establish connection with the network 6, and a bus 909 to connect those elements, when the CPU 901 executes a program loaded in the memory 902. A configuration is also possible such that this program is downloaded to the external storage unit 903 from the recording medium 904 via the reader 905, or from the network 6 via the NIC 908, and then loaded to the memory 902 to be executed by the CPU 901. Alternatively, the program may be directly loaded to the memory 902 without going through the external storage unit 903 and executed by the CPU 901. In the case above, the memory 902, the external storage unit 903, and the storage medium 904 are utilized as the storage section 14; the reader 905, the input unit 906, and the output unit 907 are utilized as the input-output section 12; and the network IF section 11 corresponds to the NIC 908.

A computer system such as a PDA may be employed as the IC tag terminal 2, which is equipped with a wireless communication device, instead of the NIC 908 in FIG. 18, to perform wireless communication with the AP 5 such as a wireless LAN, an IC tag reader/writer instead of the reader 905 in FIG. 18, and a touch panel instead of the input unit 906 and the output unit 907 in FIG. 18.

Next, a general operation of the entire record management system according to the present embodiment will be explained with a specific example.

Figure 19:
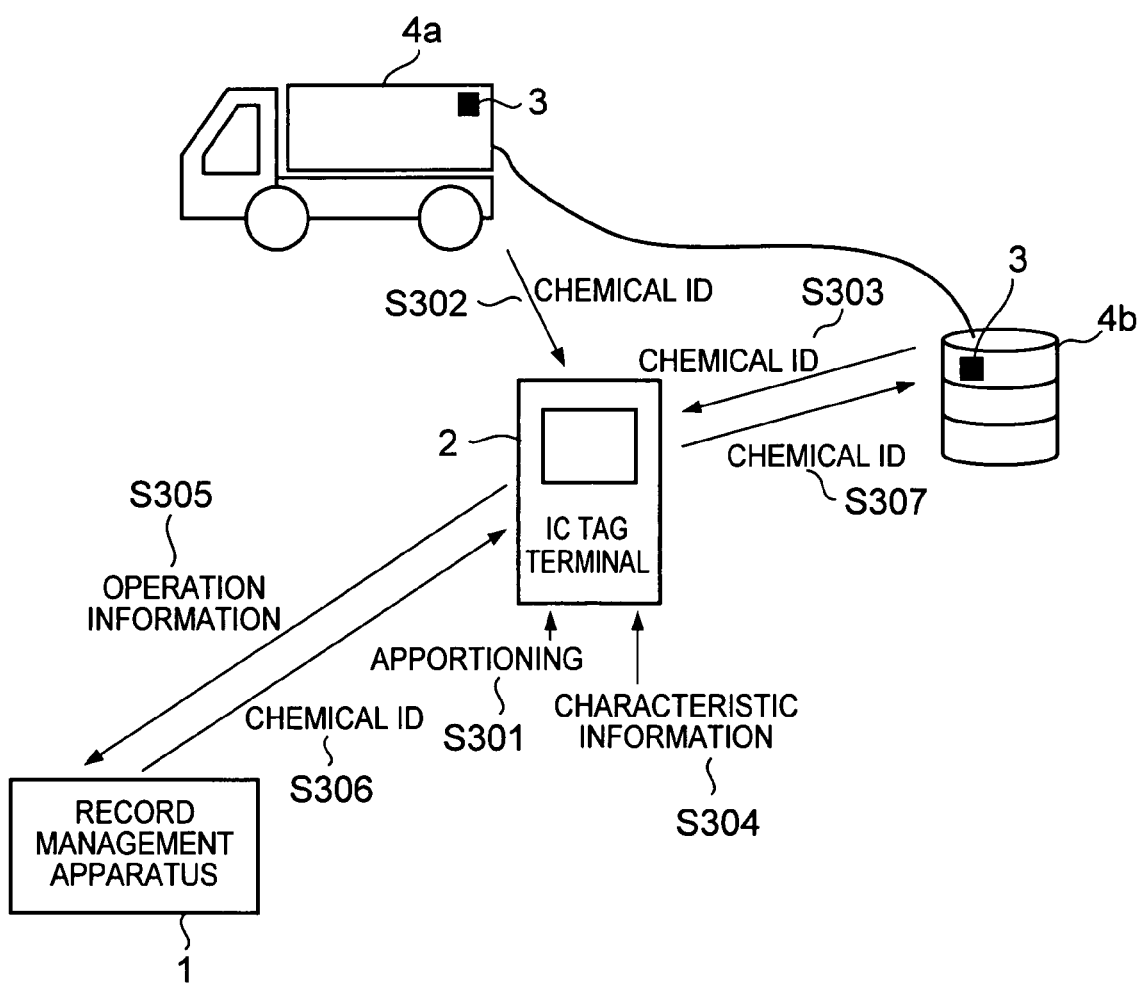
FIG. 19 illustrates a general operation of the record management system in cases where a tank truck 4a feeds a drum 4b.

FIG. 19 illustrates a general operation of the record management system in the case where a tank truck 4a feeds a drum 4b.

When a user inputs a directive to the IC tag terminal 2 to start operation and selects the operation type "apportioning" (S301), the IC tag terminal 2 starts guidance of the apportioning operation. The user follows the guidance, and brings the IC tag terminal 2 closer to the IC tag 3 that is attached to the tank truck 4a serving as an input side container. The IC tag terminal 2 then reads a chemical ID from the IC tag 3 on the tank trucker 4a (S302). Next, according to the guidance, the user brings the IC tag terminal 2 closer to the IC tag 3 attached to the drum 4b serving as a receiving side container. The IC tag terminal 2 reads a chemical ID from the IC tag 3 on the drum 4b (S303). Subsequently, the IC tag terminal 2 displays an apportioning operation acceptance screen as shown in FIG. 5, and accepts from the user an input amount (characteristic information) of the chemical from the tank truck 4a to the drum 4b (S304). The IC tag terminal 2 generates operation information including the chemical ID of the chemical held in the input side container (tank truck 4a), the chemical ID of the chemical held in the receiving side container (drum 4b), the input amount of the chemical from the input side container to the receiving side container, and the operation type "apportioning", and transmits this generated information to the record management apparatus 1 (S305).

Upon receipt of the operation information from the IC tag terminal 2, the record management apparatus 1 recognizes that the operation type included in this operation information is "apportioning" and performs the steps S121 to S125 as shown in FIG. 14, to update the contents in the storage section 14. Simultaneously, the record management apparatus 1 transmits to the IC tag terminal 2 a newly generated chemical ID of the chemical held in the receiving side container (S306). Next, the user follows the guidance, and brings the IC tag terminal 2 closer to the IC tag 3 attached to the drum 4b serving as the receiving side container. The IC tag terminal 2 then replaces the chemical ID registered in the IC tag 3 on the drum 4b with the new chemical ID received from the record management apparatus 1 (S307).

Figure 20:
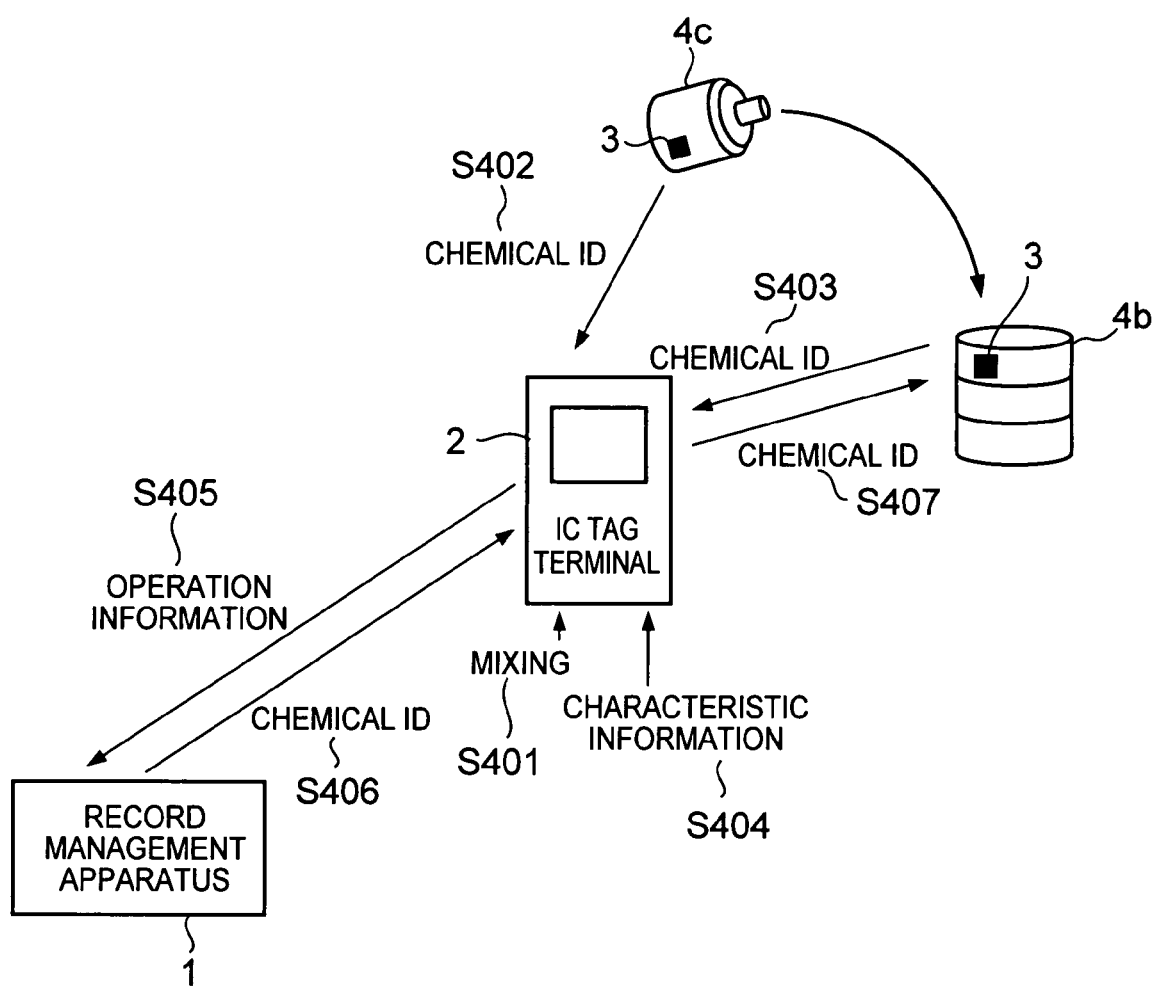
FIG. 20 is an illustration to explain a general operation of the record management system in cases where the chemical held in the drum 4b is mixed with the chemical held in a glass bottle 4c.

FIG. 20 is an illustration to explain a general operation of the record management system in the case where the chemical held in the drum 4b is mixed with the chemical held in a glass bottle 4c.

When a user inputs to the IC tag terminal 2 a directive to start operation and selects the operation type "mixing" (S401), the IC tag terminal 2 starts guidance for the mixing operation. The user follows the guidance to bring the IC tag terminal 2 closer to the IC tag 3 attached to the glass bottle 4c serving as an input side container. The IC tag terminal 2 reads a chemical ID from the IC tag 3 on the glass bottle 4c (S402). Next, the user follows the guidance to bring the IC tag terminal 2 closer to the IC tag 3 attached to the drum 4b serving as a receiving side container. The IC tag terminal 2 reads a chemical ID from the IC tag 3 on the drum 4b (S403). Subsequently, the IC tag terminal 2 displays a mixing operation acceptance screen as shown in FIG. 6, to accept from the user an amount of the chemical inputted from the glass bottle 4c to the drum 4b and management information (characteristic information) of a chemical after the mixing (S404). The IC tag terminal 2 then generates operation information including the chemical ID of the chemical held in the input side container (glass bottle 4c), a chemical ID of the chemical held in the receiving side container (drum 4b), the amount of the chemical inputted from the input side container to the receiving side container, the management information of the chemical after the mixing, and the operation type "mixing", and transmits this generated information to the record management apparatus 1 (S405).

Upon receipt the operation information from the IC tag terminal 2, the record management apparatus recognizes that the operation type included in the operation information is "mixing" and performs the steps from S131 to S135 as shown in FIG. 14, to update the contents of the storage section 14. Simultaneously, the record management apparatus transmits to the IC tag terminal 2 the newly generated chemical ID of the chemical held in the receiving side container (S406). Next, the user follows the guidance to bring the IC tag terminal 2 closer to the IC tag 3 attached to the drum 4b serving as the receiving side container. The IC tag terminal 2 replaces the chemical ID registered in the IC tag 3 on the drum 4b with the new chemical ID received from the record management apparatus 1 (S407).

Figure 21:
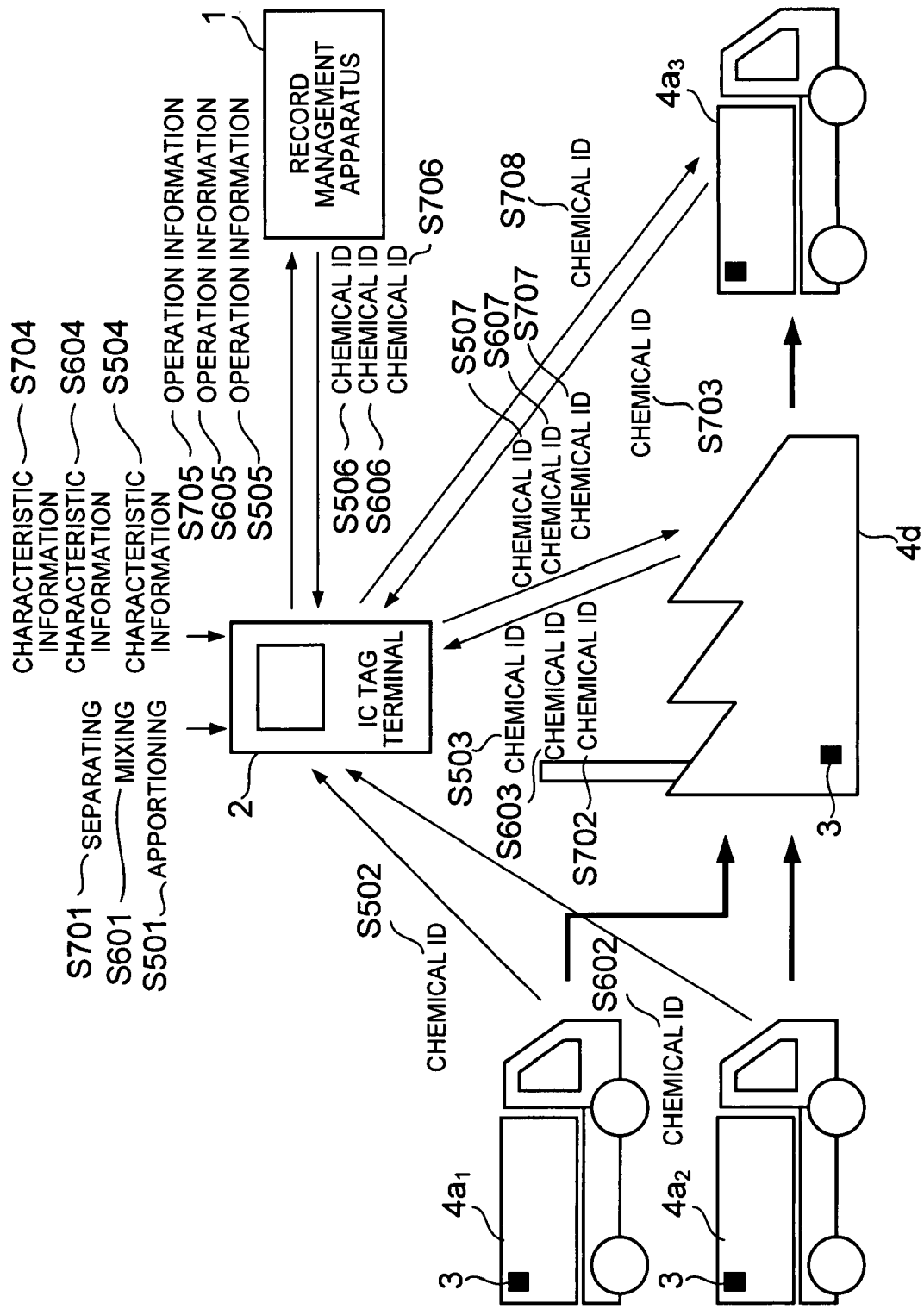
FIG. 21 is an illustration to explain a general operation of the record management system in cases where a factory 4d is assumed as a container, a new chemical is generated using as materials the chemicals received from tank trucks $4a_1$ and $4a_2$, and the generated chemical is shipped by a tank truck $4a_3$.

FIG. 21 is an illustration to explain a general operation of the record management system in cases where a factory 4d is assumed as a container, a new chemical is generated using as materials the chemicals received from the tank trucks $4a_1$ and $4a_2$, and the generated chemical is shipped by the tank truck $4a_3$.

When a user inputs to the IC tag terminal 2 a directive to start operation and selects the operation type "apportioning" (S501), the IC tag terminal 2 starts guidance of the apportioning operation. The user follows the guidance to bring the IC tag terminal 2 closer to the IC tag 3 attached to the tank truck $4a_1$ serving as an input side container. The IC tag terminal 2 then reads a chemical ID from the IC tag 3 on the tank truck $4a_1$ (S502). Next, the user brings the IC tag terminal 2 closer to the IC tag 3 attached to the factory 4d serving as a receiving side container. The IC tag terminal 2 then reads the chemical ID from the IC tag 3 attached to the factory 4d (S503). The IC tag terminal 2 displays an apportioning operation acceptance screen as shown in FIG. 5, and accepts from the user an input amount (characteristic information) of the chemical from the tank truck $4a_1$ to the factory 4d (S504). The IC tag terminal 2 generates operation information including the chemical ID of the chemical held in the input side container (tank truck $4a_1$), the chemical ID of the chemical held in the receiving side container (factory 4d), the amount of the chemical inputted from the input side container to the receiving side container, and the operation type "apportioning", and transmits the generated information to the record management apparatus 1 (S505).

Upon receipt of the operation information from the IC tag terminal 2, the record management apparatus 1 recognizes that the operation type included in this operation information is "apportioning" and performs the steps S121 to S125 as shown in FIG. 14, to update the contents of the storage section 14. Simultaneously, the record management apparatus 1 transmits, to the IC tag terminal 2, the newly generated chemical ID of the chemical held in the receiving side container (S506). Next, the user follows the guidance to bring the IC tag terminal 2 closer to the IC tag 3 attached to the factory 4d serving as the receiving side container. Then, the IC tag terminal 2 replaces the chemical ID registered in the IC tag 3 attached to the factor 4d with the new chemical ID received from the record management apparatus 1 (S507).

Subsequently, when the user inputs, to the IC tag terminal 2, a directive to start operation and selects the operation type "mixing" (S601), the IC tag terminal 2 starts guidance of the mixing operation. The user follows the guidance to bring the IC tag terminal 2 closer to the IC tag 3 attached to the tank truck $4a_2$ serving as an input side container. Then, the IC tag terminal 2 reads the chemical ID from the IC tag 3 attached to the tank truck $4a_2$ (S602). Next, the user follows the guidance to bring the IC tag terminal 2 closer to the IC tag 3 attached to the factory 4d serving as the receiving side container. Next, the IC tag terminal 2 reads the chemical ID from the IC tag 3 attached to the factory 4d (S603). Then, the IC tag terminal 2 displays a mixing operation acceptance screen as shown in FIG. 6, and accepts from the user an input amount of chemical from the tank truck $4a_2$ to the factory 4d and the management information (characteristic information) of the chemical after the mixing (S604). The IC tag terminal 2 then generates operation information including the chemical ID of the chemical held in the input side container (tank truck $4a_2$), the chemical ID of the chemical held in the receiving side container (factory 4d), the input amount of the chemical from the input side container to the receiving side container, the management information of the chemical after the mixing, and the operation type "mixing", and transmits the generated information to the record management apparatus 1 (S605).

Upon receipt of the operation information from the IC tag terminal 2, the record management apparatus 1 recognizes that the operation type included in the operation information is "mixing" and performs the steps from S131 to S135 as shown in FIG. 14, to update the contents of the storage section 14. Simultaneously, the record management apparatus 1 transmits to the IC tag terminal 2 the newly generated chemical ID of the chemical held in the receiving side container (S606). Next, the user follows the guidance to bring the IC tag terminal 2 closer to the IC tag 3 attached to the factory 4d serving as the receiving side container. The IC tag terminal 2 then replaces the chemical ID registered in the IC tag 3 attached to the factor 4d with the new chemical ID received from the record management apparatus 1 (S607).

Next, when the user inputs, to the IC tag terminal 2, a directive to start operation and selects the operation type "separating" (S701), the IC tag terminal 2 starts guidance of the separating operation. The user follows the guidance to bring the IC tag terminal 2 closer to the IC tag 3 attached to the factory 4d serving as the input side container. The IC tag terminal 2 reads the chemical ID from the IC tag 3 attached to the factory 4d (S702). Next, the user follows the guidance to bring the IC tag terminal 2 closer to the IC tag 3 attached to the tank truck $4a_3$ serving as the receiving side container. The IC tag terminal 2 then reads a chemical ID from the IC tag 3 attached to the tank truck $4a_3$ (S703). The IC tag terminal 2 displays a separating operation acceptance screen as shown in FIG. 8A and FIG. 8B, and accepts from the user an input amount of the chemical from the factory 4d to the tank truck $4a_3$, the management information of the chemical after the separation held in the input side container, and the composition information (characteristic information) (S704). The IC tag terminal 2 generates operation information including the chemical ID of the chemical held in the input side container (factory 4d), the chemical ID of the chemical held in the receiving side container (tank truck $4a_3$), the input amount of chemical from the input side container to the receiving side container, the management information of the chemical after the separation, and operation type "separating", and transmits the generated information to the record management apparatus 1 (S705).

Upon receipt of the operation information from the IC tag terminal 2, the record management apparatus 1 recognizes that the operation type included in the operation information is "separating" and performs the steps S151 to S155 as shown in FIG. 14, to update the contents of the storage section 14. Simultaneously, the record management apparatus 1 transmits to the IC tag terminal 2 the chemical ID of the newly generated chemical held in the input side container and the chemical ID of the newly generated chemical held in the receiving side container (S706). Next, the user follows the guidance to bring the IC tag terminal 2 closer to the IC tag 3 attached to the factory 4d serving as the input side container. The IC tag terminal 2 then replaces the chemical ID registered in the IC tag 3 attached to the factory 4d with the new chemical ID received from the record management apparatus 1 (S707). In addition, the user follows the guidance to bring the IC tag terminal 2 closer to the IC tag 3 attached to the tank truck $4a_3$ serving as the receiving side container. The IC tag terminal 2 replaces the chemical ID registered in the IC tag 3 attached to the tank truck $4a_3$ with the new chemical ID received from the record management apparatus 1 (S708).

As described above, one exemplary embodiment of the present invention has been explained. According to the present embodiment, it is possible to manage a chemical of indefinite form in a manner such that the operation record of the chemical is traceable.

It is to be noted that the present invention is not limited to the exemplary embodiment as described above, but it may be modified variously within the scope of the invention. For example, in the exemplary embodiment above, the storage section 14 is not necessarily provided in one computer system, but may be arranged in a distributed manner on a network. Similarly, each element of the computation unit 13 may be implemented by multiple computers.

In the embodiment above, an explanation has been given taking as an example cases in which operation record is managed for a chemical of indefinite form. However, the present invention is not limited to this example. The present invention can be broadly applied to operation record management for an object to which an IC tag cannot be attached directly.

What is claimed is:

1. A record management system that manages an operation record for a chemical, comprising:
    an IC tag that is attached to each container for holding the chemical;
    an IC tag terminal that reads data from and writes data to the IC tag; and
    a record management apparatus that manages record information of the chemical;
wherein:
    the IC tag terminal includes:
    a reading unit that reads from the IC tag a chemical ID for identifying the chemical held in the container to which the IC tag is attached;
    a terminal side accepting unit that accepts an entry of an operational description for the chemical from a predetermined operational description for the chemical and accepts from an operator, via an entry form screen that accepts an entry of characteristic information of a chemical that is an object of an operation corresponding to the operational description, an entry of the characteristic information; and a terminal side sending unit that sends to the record management apparatus the chemical ID read by the reading unit and operation information including the operational description and characteristic information for the chemical accepted by the terminal side accepting unit;

the record management apparatus includes:

a mass update record storing unit that stores a mass update record of each chemical having the chemical ID;

a composition storing unit that stores composition information including a chemical ID of a chemical constituting each chemical having the chemical ID;

a chemical ID correspondence storing unit that stores a correspondence between a new chemical ID and an old chemical ID, wherein the old chemical ID is assigned to a previous state of the chemical before the operation corresponding to the operational description is performed thereon and the new chemical ID is assigned to a subsequent state of the chemical after the operation corresponding to the operational description is performed thereon;

a management apparatus side receiving unit that receives the operation information from the IC tag terminal; and an updating unit that updates the chemical ID correspondence storing unit according to the operation information received by the management apparatus side receiving unit, wherein updating the chemical ID correspondence unit comprises replacing the old chemical ID with the new chemical ID; and the IC tag terminal further includes:

a terminal side receiving unit that receives the new chemical ID from the record management apparatus; and a writing unit that writes the new chemical ID received by the terminal side receiving unit to the IC tag attached to at least one of an inputting side container and a receiving side container.

2. The record management system according to claim 1, wherein;

when an operation type indicated by the operation information received by the management apparatus side receiving unit is either of "mixing" and "apportioning", the reading unit reads from the IC tag attached to an inputting side container and the IC tag attached to a receiving side container a chemical ID for identifying a chemical, according to an input amount included in the operation information, the updating unit updates a mass update record of a mass of the chemical having an input side chemical ID which is included in the operation information and which is stored in the mass update record storing unit, and having a receiving side chemical ID which is included in the operation information as the old chemical ID, and having a newly generated chemical ID as the new chemical ID, wherein the chemical ID correspondence storing unit stores the correspondence between the newly generated chemical ID and the updated old chemical ID, according to the mass update record of a mass of the chemical having the updated old chemical ID included in the operation information, the mass update record storing unit stores the mass update record of the chemical having the newly generated chemical ID which is stored in the mass update record storing unit and the input amount which is included in the operation information, and the writing unit writes the newly generated chemical ID to the IC tag attached to the receiving side container.

3. The record management system according to claim 2, wherein, when the operation type indicated by the operation information received by the management apparatus side receiving unit is "mixing" the updating unit generates composition information of the chemical having the new chemical ID, the composition information including the old chemical ID and the input side chemical ID, and stores the composition information in the composition storing unit.

4. The record management system according to claim 2, wherein, when an operation type indicated by the operation information received by the management apparatus side receiving unit is "apportioning", the updating unit generates composition information of the chemical having the new chemical ID, the composition information including the old chemical ID, and stores the composition information in the composition storing unit.

5. The record management system according to claim 1, wherein, when an operation type indicated by the operation information received by the management apparatus side receiving unit is "importing", the updating unit sets a null code as the old chemical ID and a newly generated chemical ID as the new chemical ID, stores in the chemical ID correspondence storing unit a correspondence between the newly generated chemical ID and the old chemical ID, stores, in the mass update record storing unit, a mass update record of the chemical having the newly generated chemical ID according to the mass included in the operation information, generates composition information, including, as the composition information of the chemical having the newly generated chemical ID, the composition which is included in the operation information, wherein the composition information is stored in the composition storing unit, and the writing unit writes the newly generated chemical ID to the IC tag attached to the receiving side container.

6. The record management system according to claim 1, wherein, when an operation type indicated by the operation information received by the management apparatus side receiving unit is "reacting", the reading unit reads from the IC tag attached to a receiving side container a chemical ID for identifying a chemical, the updating unit sets the receiving side chemical ID included in the operation information as the old chemical ID and a newly generated chemical ID as the new chemical ID, stores in the chemical ID correspondence storing unit a correspondence between the newly generated chemical ID and the old chemical ID, stores, in the mass update record storing unit, a mass update record of the chemical having the newly generated chemical ID according to the mass included in the operation information, generates composition information, including, as the composition information of the chemical having the newly generated chemical ID, the composition which is included in the operation information, wherein the composition information is stored in the composition storing unit, and the writing unit writes the newly generated chemical ID to the IC tag attached to the receiving side container.

7. The record management system according to claim 1, wherein, when an operation type indicated by the operation information received by the management apparatus side receiving unit is "separating", the reading unit reads from both of the IC tag attached to an inputting side container and the IC tag attached to a receiving side container a chemical ID for identifying a chemical, the updating unit sets the receiving side chemical ID and the input side chemical ID, included in the operation information, as the old chemical ID and a newly generated chemical ID as the new chemical ID, stores in the chemical ID correspondence storing unit a correspondence between the newly generated chemical ID and the old chemical ID, stores, in the mass update record storing unit, a mass update record of the chemical having the newly generated chemical ID according to the mass included in the operation information, generates composition information, including, as the composition information of the chemical having the newly generated chemical ID, the composition which is included in the operation information, wherein the composition information is stored in the composition storing unit, and the writing unit writes the newly generated chemical ID to the IC tag attached to the inputting side container and the receiving side container.

8. The record management system according to claim 1, wherein the record management apparatus further comprises:

a management apparatus side accepting unit that accepts a tracing survey request with a designation of a chemical ID; and a tracing survey unit that traces and surveys an operation record for a chemical having the chemical ID designated in the tracing survey request, wherein the tracing survey unit comprises:

a tree searching unit that:

retrieves, from the chemical ID correspondence storing unit, ID correspondence information having the designated chemical ID as the new chemical ID, and if the ID correspondence information is retrieved, by repeating processing to newly designate the old chemical ID of the retrieved ID correspondence information, and designating the chemical ID designated in the tracing survey request as an initial chemical ID, specifies, in a tree indicating a transition of the chemical ID, each chemical ID positioned upstream of the chemical ID which is designated by the tracing survey request, and retrieves, from the chemical ID correspondence storing unit, ID correspondence information having the designated chemical ID as the old chemical ID, and if the ID correspondence information is retrieved, by repeating processing to newly designate the new chemical ID of the retrieved ID correspondence information, and designating the chemical ID designated in the tracing survey request as an initial chemical ID, specifies each chemical ID positioned downstream of the chemical ID designated by the tracing survey request, in a tree indicating a transition of the chemical ID; and a result output unit that outputs a search result from the tree searching unit.

9. A record management apparatus that manages an operation record for a chemical, the apparatus comprising:

a mass update record storing unit that stores a mass update record of each chemical having a chemical ID;

a composition storing unit that stores composition information including a chemical ID of a chemical constituting each chemical having the chemical ID;

a receiving unit that receives operation information from an IC tag terminal, wherein the operation information defines parameters of at least one operation to be performed on a corresponding chemical;

a chemical ID correspondence storing unit that stores a correspondence between a new chemical ID and an old chemical ID, wherein the old chemical ID is assigned to a previous state of the chemical before the operation identified in the corresponding operation information is performed thereon and the new chemical ID is assigned to a subsequent state of the chemical after the operation identified in the corresponding operation information is performed thereon;

an updating unit that updates the chemical ID correspondence storing unit according to the operation information received by the receiving unit, wherein updating the chemical ID correspondence unit comprises replacing the old chemical ID with the new chemical ID; and a sending unit that sends, to the IC tag terminal, as the chemical ID, the new chemical ID newly stored in the chemical ID correspondence storing unit, wherein, when an operation type indicated by the operation information received by the receiving unit is either of "mixing" and "apportioning", according to an input amount included in the operation information, the updating unit updates a mass update record, stored in the mass update record storing unit, of a mass of the chemical having an input side chemical ID included in the operation information, sets a receiving side chemical ID included in the operation information as the old chemical ID, sets a newly generated chemical ID as the new chemical ID, stores in the chemical ID correspondence storing unit a correspondence between the newly generated chemical ID and the old chemical ID, and stores, in the mass update record storing unit, the mass update record of the chemical having the newly generated chemical ID, according to the mass update record, stored in the mass update record storing unit, of the chemical having the old chemical ID included in the operation information, and the input amount included in the operation information.

10. An operation record management method to trace a chemical according to a record management system including a record management apparatus that is provided with an IC tag attached to each container holding a chemical, an IC tag terminal that reads data from and writes data to the IC tag, a mass update record storing unit that stores a mass update record of each chemical having the chemical ID, a composition storing unit that stores composition information including a chemical ID of a chemical constituting each chemical having the chemical ID, and a chemical ID correspondence storing unit that stores a correspondence between a new chemical ID and an old chemical ID, wherein:

the IC tag terminal reads, from the IC tag, a chemical ID that identifies a chemical held in a container to which the IC tag is attached;

the IC tag terminal accepts from an operator an entry of an operational description for the chemical from a predetermined operational description for the chemical;

the IC tag terminal accepts from an operator, via an entry form screen that accepts characteristic information of a chemical that is the object of an operation corresponding to the operational description, an entry of the characteristic information;

the IC tag terminal sends, to the record management apparatus, operation information including the chemical ID being read, the operational description for the chemical that has been accepted, and characteristic information of the accepted chemical;

the record management apparatus receives the operation information from the IC tag terminal;

the record management apparatus updates the chemical ID correspondence storing unit that stores the correspondence between the new chemical ID and the old chemical ID, wherein the old chemical ID is assigned to a previous state of the chemical before the operation identified in the corresponding operation information is performed thereon and the new chemical ID is assigned to a subsequent state of the chemical after the operation identified in the corresponding operation information is performed thereon, wherein updating the chemical ID correspondence storing unit comprises replacing the old chemical ID with the new chemical ID according to the operation information;

the record management apparatus sends, to the IC tag terminal, as the chemical ID, the new chemical ID newly stored in the ID correspondence information storing unit;

the IC tag terminal receives the new chemical ID from the record management apparatus; and the IC tag terminal writes the received new chemical ID to the IC tag attached to at least one of a inputting side container and a receiving side container.

11. The operation record management method according to claim 10, wherein:

when an operation type indicated by the operation information is either of "mixing" and "apportioning", according to an input amount included in the operation information, the record management apparatus updates a mass update record, stored in the mass update record storing unit, of the chemical having an input side chemical ID included in the operation information, sets a receiving side chemical ID included in the operation information as the old chemical ID, sets a newly generated chemical ID as the new chemical ID, stores in the chemical ID correspondence storing unit a correspondence between the newly generated chemical ID and the old chemical ID, and stores, in the mass update record storing unit, the mass update record of the chemical having the newly generated chemical ID, according to the mass update record, stored in the mass update record storing unit, of the chemical having the old chemical ID included in the operation information, and the input amount included in the operation information, and the IC tag terminal writes the newly generated chemical ID received by the record management apparatus to the IC tag attached to the receiving side container.

* * * * *